(12) United States Patent
Gold

(10) Patent No.: US 7,009,350 B1
(45) Date of Patent: Mar. 7, 2006

(54) ENERGY COLLECTION AND STORAGE SYSTEM

(75) Inventor: Robert J. Gold, El Mirage, AZ (US)

(73) Assignee: Great Systems, Inc., El Mirage, AZ (US)

(*) Notice: Subject to any disclaimer, the term of this patent is extended or adjusted under 35 U.S.C. 154(b) by 0 days.

(21) Appl. No.: 11/054,852

(22) Filed: Feb. 10, 2005

Related U.S. Application Data

(60) Provisional application No. 60/544,696, filed on Feb. 13, 2004, provisional application No. 60/579,532, filed on Jun. 14, 2004.

(51) Int. Cl.
H02P 5/20 (2006.01)

(52) U.S. Cl. .................... 318/142; 318/140; 318/141; 290/1 A; 290/1 R; 320/125; 320/103; 320/117; 700/297

(58) Field of Classification Search ............... None
See application file for complete search history.

(56) References Cited

U.S. PATENT DOCUMENTS

| | | | |
|---|---|---|---|
| 983,742 A | 2/1911 | Mead | |
| 1,366,461 A | 1/1921 | Johnson | |
| 2,524,005 A | 9/1950 | Boe | |
| 2,544,077 A | 3/1951 | Gardner | |
| 3,099,402 A | 7/1963 | Speck | |
| 3,240,947 A * | 3/1966 | Mas | 290/50 |
| 3,257,905 A | 6/1966 | Weisman et al. | |
| 3,286,152 A * | 11/1966 | Noe | 320/117 |
| 3,356,869 A | 12/1967 | Hilton et al. | |
| 3,478,231 A | 11/1969 | Knoepfel et al. | |
| 3,510,745 A * | 5/1970 | Futterer | 322/1 |
| 3,573,479 A | 4/1971 | Rieth | |
| 3,766,399 A | 10/1973 | Demetrescu | |
| 3,800,212 A | 3/1974 | Branco et al. | |
| 3,818,467 A * | 6/1974 | Willis | 340/539.3 |
| 3,895,236 A | 7/1975 | Herron | |
| 4,032,829 A | 6/1977 | Schenavar | |
| 4,074,527 A | 2/1978 | Sadler | |
| 4,105,314 A * | 8/1978 | Hughes, Jr. | 353/85 |
| 4,227,092 A * | 10/1980 | Campagnuolo et al. | 290/1 C |
| 4,287,428 A | 9/1981 | Smith | |
| 4,360,860 A * | 11/1982 | Johnson et al. | 362/192 |
| 4,370,576 A | 1/1983 | Foster, Jr. et al. | |
| 4,418,286 A | 11/1983 | Scott | |
| 4,438,343 A | 3/1984 | Marken | |
| 4,511,805 A | 4/1985 | Boy-Marcotte et al. | |
| 4,532,431 A | 7/1985 | Iliev et al. | |
| 4,594,521 A | 6/1986 | Schlicher | |
| 4,703,188 A * | 10/1987 | Gottfried | 290/38 B |
| 4,746,806 A * | 5/1988 | Campagnuolo et al. | 290/1 R |
| 4,862,021 A | 8/1989 | LaRoca | |
| 4,931,947 A * | 6/1990 | Werth et al. | 700/297 |

(Continued)

OTHER PUBLICATIONS

Grote, Kevin, "The Home of Ordnance and Energetics Excellence!" Ordnance Technology, Indian Head division, NSWC, *NAVSEA*, Indian Head, MD, http://www.ih.navy.mil.

*Primary Examiner*—Paul Ip
(74) *Attorney, Agent, or Firm*—Craig A. Fieschko, Esq.; DeWitt Ross & Stevens S.C.

(57) ABSTRACT

A power generation and/or storage device utilizes human motion inputs or other power sources (i.e. hydraulics, pneumatics or explosive gases) to create mechanical kinetic energy that is stored (preferably in springs) and later released on demand to rotate a generator to produce electricity.

19 Claims, 20 Drawing Sheets

U.S. PATENT DOCUMENTS

| | | | |
|---|---|---|---|
| 4,961,151 A * | 10/1990 | Early et al. ................... | 700/297 |
| 4,962,462 A * | 10/1990 | Fekete ......................... | 700/297 |
| 5,172,784 A | 12/1992 | Varela, Jr. | |
| 5,316,101 A * | 5/1994 | Gannon ....................... | 180/221 |
| 5,396,951 A | 3/1995 | Ross | |
| 5,397,922 A | 3/1995 | Paul et al. | |
| 5,418,444 A * | 5/1995 | Cook et al. .................. | 320/125 |
| 5,481,175 A * | 1/1996 | Qualich et al. .............. | 320/103 |
| 5,485,788 A | 1/1996 | Corney | |
| 5,668,414 A | 9/1997 | Takahashi et al. | |
| 5,773,748 A | 6/1998 | Makowiecki et al. | |
| 5,788,003 A | 8/1998 | Spiers | |
| 5,867,007 A * | 2/1999 | Kim ............................. | 320/118 |
| 5,874,823 A * | 2/1999 | Suzuki ......................... | 320/125 |
| 5,880,532 A * | 3/1999 | Stopher ....................... | 290/1 E |
| 5,917,310 A | 6/1999 | Baylis | |
| 5,929,531 A | 7/1999 | Lagno | |
| 5,929,602 A * | 7/1999 | Suzuki ......................... | 320/116 |
| 5,982,138 A * | 11/1999 | Krieger ........................ | 320/105 |
| 5,982,577 A | 11/1999 | Brown et al. | |
| 6,034,492 A * | 3/2000 | Saito et al. ................... | 318/141 |
| 6,099,255 A | 8/2000 | Lee | |
| 6,181,110 B1 | 1/2001 | Lampis | |
| 6,236,118 B1 | 5/2001 | Vasija et al. | |
| 6,250,388 B1 | 6/2001 | Carmi et al. | |
| 6,260,776 B1 | 7/2001 | Popp | |
| 6,270,024 B1 | 8/2001 | Popp | |
| 6,288,522 B1 * | 9/2001 | Odaohhara et al. ......... | 320/138 |
| 6,291,900 B1 * | 9/2001 | Tiemann et al. ............. | 290/1 A |
| 6,296,960 B1 | 10/2001 | Faris et al. | |
| 6,309,771 B1 | 10/2001 | Faris et al. | |
| 6,409,096 B1 | 6/2002 | Popp | |
| 6,460,785 B1 | 10/2002 | Popp | |
| 6,462,511 B1 * | 10/2002 | Kwok ......................... | 320/119 |
| 6,544,678 B1 | 4/2003 | Faris et al. | |
| 6,545,445 B1 * | 4/2003 | McDermott et al. ........ | 320/103 |
| 6,588,918 B1 * | 7/2003 | Millar ......................... | 362/192 |
| 6,591,535 B1 | 7/2003 | Reynolds | |
| 6,734,651 B1 * | 5/2004 | Cook et al. .................. | 320/103 |
| 6,747,246 B1 * | 6/2004 | Crandell, III ............. | 219/130.1 |
| 6,777,913 B1 * | 8/2004 | You ............................ | 320/125 |
| 6,914,340 B1 * | 7/2005 | Becker et al. .............. | 290/1 R |
| 2001/0010456 A1 * | 8/2001 | Kaite et al. ................. | 320/125 |
| 2002/0167174 A1 * | 11/2002 | Haass et al. ................ | 290/1 A |
| 2003/0042741 A1 * | 3/2003 | Hartman et al. ............ | 290/1 C |
| 2004/0090210 A1 * | 5/2004 | Becker et al. ................ | 322/1 |
| 2004/0192407 A1 * | 9/2004 | Formenti .................... | 455/572 |
| 2005/0035737 A1 * | 2/2005 | Elder et al. ................. | 320/103 |
| 2005/0082833 A1 * | 4/2005 | Sodermann et al. ........ | 290/1 A |
| 2005/0194937 A1 * | 9/2005 | Jacobs ........................ | 320/135 |

* cited by examiner

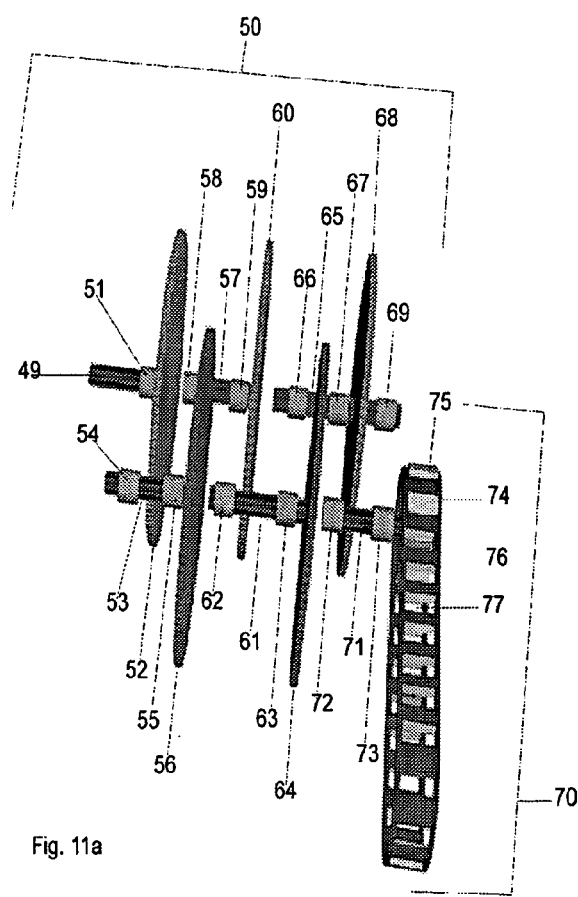
Fig. 11a
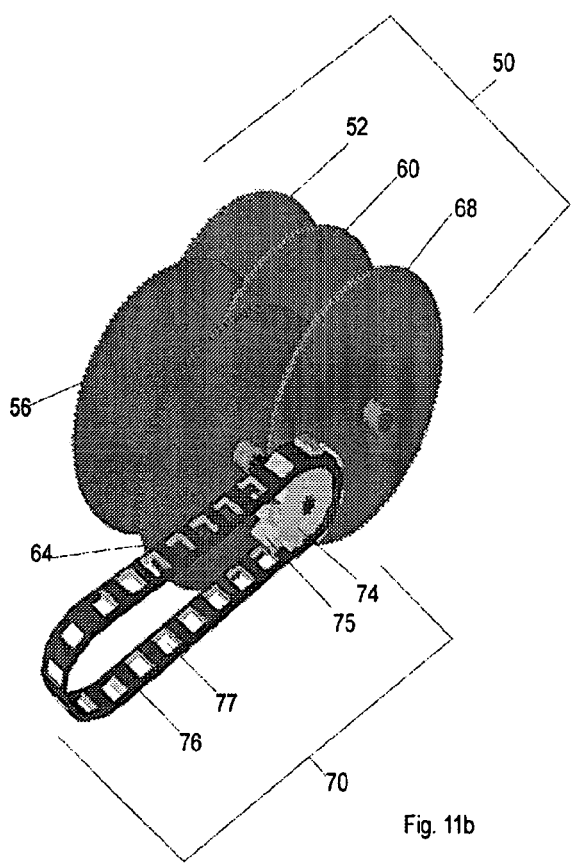
Fig. 11b
FIG. 11

ENERGY COLLECTION AND STORAGE SYSTEM

CROSS-REFERENCE TO RELATED APPLICATIONS

This application claims priority under 35 USC § 119(e) to U.S. Provisional Patent Application 60/544,696 filed 13 Feb. 2004 and 60/579,532 filed 14 Jun. 2004, the entireties of which are incorporated by reference herein.

FIELD OF THE INVENTION

This invention relates to a man-portable field power generation and energy storage device that can utilize numerous natural and artificially produced kinetic energy sources to create mechanical kinetic energy which is then stored and released on demand to create electric power or do other mechanical work.

BACKGROUND OF THE INVENTION

As portable electronic devices proliferate, the problem of having a source of power that is steady and reliable confronts everyone, including consumers, industry, the government and the military. At present, only batteries are available on a widespread basis. Although research is underway on fuel cells, they have not yet reached the point where they can be readily commercialized or integrated with existing man-portable electronic devices. There are devices on the market that have the ability, by winding a clock-type concentric spring, to use the output of the spring to directly spin a generator to produce power for the specific use of the energy output by the device. These include flashlights, radios and combinations of the two. As the power of the single clock-type expansion spring winds down in these devices the energy output diminishes. Thus due to their design they do not have the ability to output constant levels of power over the output time of the spring. Additionally, current products using any type of spring power system have a gap between their ability to produce power or run their imbedded components. The springs wind down and the energy stops whereupon the user is forced to rewind the spring while no power is available for continued operations of the device. Current designs also do not allow for the charging of multiple internal springs to store a larger reserve of energy than the single spring holds, nor do the current designs allow for discharging the spring while simultaneously charging one or more additional springs in a bank of springs. Additionally, the current products on the market do not have the ability to use multiple kinetic energy input sources to charge their spring energy sources, nor can they deliver the energy input to their systems in any way other than the manual winding of their single full rotation clock-type spring format around which they are designed.

SUMMARY OF THE INVENTION

The invention, which is defined by the claims set forth at the end of this document, is directed to devices which at least partially alleviate the aforementioned problems. A basic understanding of some of the preferred features of the invention can be attained from a review of the following brief summary of the invention, with more details being provided elsewhere in this document.

This invention relates to a field power generation and energy storage device that can utilize numerous natural and artificially produced kinetic energy sources to create mechanical kinetic energy which is then stored, preferably in one or more spring configurations, and can later be released on demand to create electric power or do other mechanical work. More specifically the preferred version describes a kinetic energy input and storage system that can utilize rotational kinetic energy, or linear kinetic energy converted into rotational energy, which is transferred as mechanical energy to drive a gear system that winds one or more constant force spring motors. The spring motors utilize a restraining (pawl) mechanism to hold the power in compressed spring format until needed. The stored energy can be released on demand. The release of the stored spring energy provides a high torque rotational force that is configured through a second integral gear system into a lower torque, but higher high speed rotational force which is used to do work, primarily in the form of spinning a generator to produce electrical power. The generation of electrical power, once conditioned, rectified or modulated can supply a direct feed to output terminals on a control panel to meet output load requirements or can be channeled to an internal or external storage battery where it can be used for on-demand distribution at a lower output rate over an extended timeframe. Additionally and more specifically, an energy system as described above having a self adjusting and self-regulating control circuitry that switches output power from the direct spring motor driven generator output to storage battery source output when the spring motor is near depletion so that the spring motor can be recharged with kinetic energy while the storage battery continues to output electrical power. The battery system will continue to supply power until the control circuitry of the invention senses the spring motor is recharged and is again capable of taking over the generation of a direct output of energy via spinning generator to produce energy to power a load on the system. In this manner the Invention can supply a continuous stream of electrical energy without disruption while still allowing the Invention to be recharged itself without disrupting the output energy flow.

Preferred versions of the invention also include an energy system as described above having a self adjusting and self-regulating control circuitry that switches output power from the direct spring motor-driven generator, which is shut down to conserve reserve energy in the spring motor, to output from the storage battery source when the load on the system is determined to be lower than the maximum output from the spring motor-driven generator. In this manner the Invention can supply a high power output for a shorter timeframe between recharges of the spring motor system and a lower power, but longer timeframe, output from the storage battery when the load on the system is less than the maximum of the spring motor generation system. In this mode the internal self-adjusting and self-regulating control circuitry would initiate activation of the spring motor-driven generator in an "as needed" capacity to recharge and top off the internal battery, thus allowing a smaller, lighter, lower density and energy capacity internal battery to provide on-going power requirements that for short bursts of time could be equal to, or greater than, heavier and higher density batteries.

Preferred versions of the invention also include an energy system as described above having the ability to be physically charged by the user utilizing personal body mechanics using an input lever or other mechanical linkage.

Preferred versions of the invention also include an energy system as described above having the ability to be physically charged via an energy input system, either integral or external to the invention, that can use one of multiple types of natural and artificially produced energy sources, including but not limited to hydraulic power, pneumatic power, explosive cartridge power or other fluidic pressure generation system.

Preferred versions of the invention also include an energy system as described above having adaptors to its system which allow the motion of one or more components within the invention to act as a pump for air or fluids via the action of the basic charging methodology of the device.

Preferred versions of the invention also include an energy system as described above having the ability to be easily carried (man-portable) by one person due to its physical size and weight.

As discussed below, the invention provides a sustainable electrical energy source that can be recharged while still outputting power. The invention's ability to accept and store kinetic energy as it still outputs electrical energy provides a substantial advantage over existing designs and products. Other advantages of the preferred versions follow.

Power Output Source Can Be Shifted to other Systems During Recharge Operation: The Invention's unique Intelligent Battery System switches power from direct generation via spring motor and generator to batteries when the system needs to recharge the internal spring motor drive system. This means there is never a gap in power. Kinetic energy can be input into the Invention's system while its integral batteries take over, on the fly, to output power. In dual or multi-spring motor systems the second spring motor can output power as the first is quickly recharged thus allowing a continuous output of direct generated power even without the ability to switch to a battery source during the recharge of kinetic energy into a spring motor.

"Perceived" High Energy Storage Capacity: User can operate devices for extended periods of time. Other portable energy sources have finite power to draw upon before recharging or replacing their power source. This means carrying heavy replacement batteries or containerized liquid fuel for fuel cells to extend their power. The Invention actually has a relatively small energy storage capacity divided into two types of available power batteries and the spring motor. The system can also use body mechanics or a modular controllable energy source to internally recharge the batter and spring system as needed to create a sustainable energy output. This creates the perception and usability of a long lasting, high-density energy system.

Ability to Store Power for Long Periods of Time Without Major Degradation of Energy Reserves: The Invention wastes very little energy in storage because it can retain energy in three different ways first as immediate short-term reserves in lightweight high density, rechargeable batteries. This power can degrade if not used in the short-term; second as intermediate energy storage that does not readily dissipate over time due to the use of compressed kinetic energy potential that is stored in a physical format. This energy has a specific output timeframe and is used for direct energy generation; and third, body mechanics as an energy source, or if using a cartridge energy source or other modular pneumatic or hydraulic external energy source, as fuel with a long shelf life, that can be used to recharge the energy reserves of the other two energy output systems. Unlike high energy, high weight, high capacity batteries that degrade with time, or fuel cells that use liquid fuels that have a limited shelf life, the Invention's use of body mechanics that are always readily available leaves an open ended lifespan for generating power for the system. Also, the use of explosive or pneumatic energy modules can be stored for long periods of time with only minor degradation. Power actually created, but not yet used within the system can be retained in a physical kinetic energy format due to the unique nature of the invention's power generation system. Also, a variable level power but instant access power supply is stored in light weight high capacity rechargeable and replaceable batteries that can be intelligently tasked to loads.

Never Waste Excessive Stored Energy: The Invention's small energy reserves never waste large amounts of stored energy if the intended use of the energy ends quicker than anticipated, or if the unit needs to be stored on stand-by for an extended period of time. Because power is created as needed by the Invention, the only energy that could be wasted is the energy in the on-board small reserve batteries or one charge of the spring motor energy storage system.

Man-Portable: The Invention's small size and weight allow the Invention to be carried and used by a single person. Because power is important to individuals in many remote and hazardous situations, the ability for one person to carry and use the Invention creates a very useful portable device.

Further advantages, features, and objects of the invention will be apparent from the following detailed description of the invention in conjunction with the associated drawings.

BRIEF DESCRIPTION OF THE DRAWINGS

FIG. 11: Multiple views of the Gear Assembly

DETAILED DESCRIPTION OF PREFERRED VERSIONS OF THE INVENTION

The current invention is a compact device that has several integrated mechanical subsystems that work together to create a device for the collection, storage and/or delivery of kinetic energy that can later be released on demand to do work. The invention can utilize its stored kinetic energy to perform various types of work. The invention can utilize one of several types of available kinetic energy inputs to charge the invention's storage system. Among the inputs that can be utilized is the physical energy of the user via body mechanics using the hand, foot or other body part to deliver pressure to a lever, pulley or linear rod that wind the gear system. Additional inputs also include the use of pulsed hydraulic pressure, compressed gas or an explosive cartridge to produce expanding gases to drive a piston or other linkage connected to the gearing to charge the system. The input energy is then stored in one or more constant force spring motors that are capable of accepting the energy and storing it for later release on demand to do work. The work performed is via connection of the invention to one of a multitude of work adaptor subsystems. The connection to, and rotation of, a generator can produce electricity as the work output. The connection to, and rotation of, a flexible rotary shaft will enable various physical machining, pumping and impact operations as the work output of the invention. The unit can be small enough to be man portable so it can be carried as a backpack or by hand. The current invention can also be built in a larger format to be used as a stationary or vehicle-mounted device. The invention can utilize a number of different physical configurations to produce the same effect, with all configurations centered on the invention's basic construction premises as stated above. These configuration sub sets can include the mixing and matching of different methodologies for each sub-system.

Figure 1:
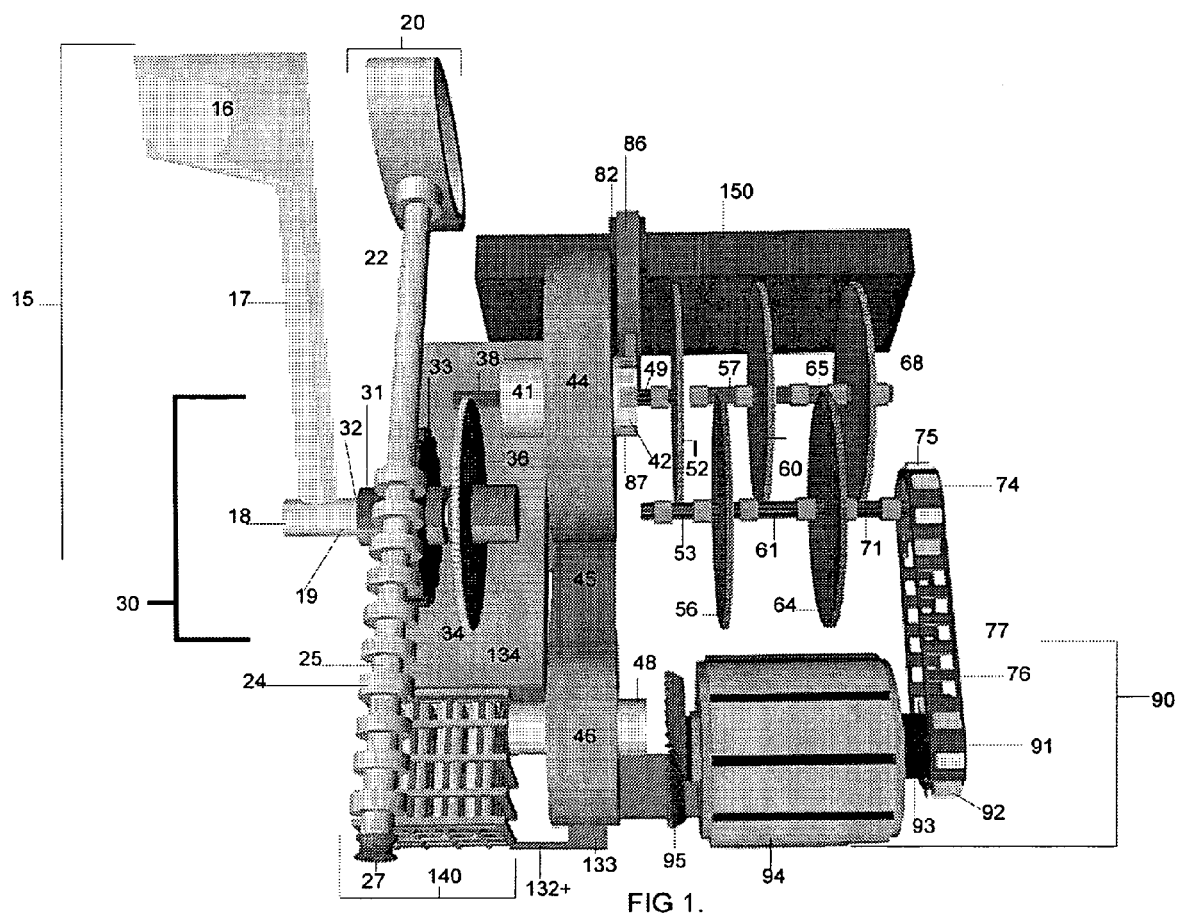
FIG. 1: Overhead Rear view of Invention without Support Structure

FIG. 1 shows an overhead (or top down view) of the Invention 10 without an enclosure or other Support Structure 100 that would normally be useful to support all components in place in normal operation of the Invention 10. The Support Structure 100 is not shown in most figures for optimal clarity of the interconnections of the mechanical components of the Invention 10.

Figure 6:
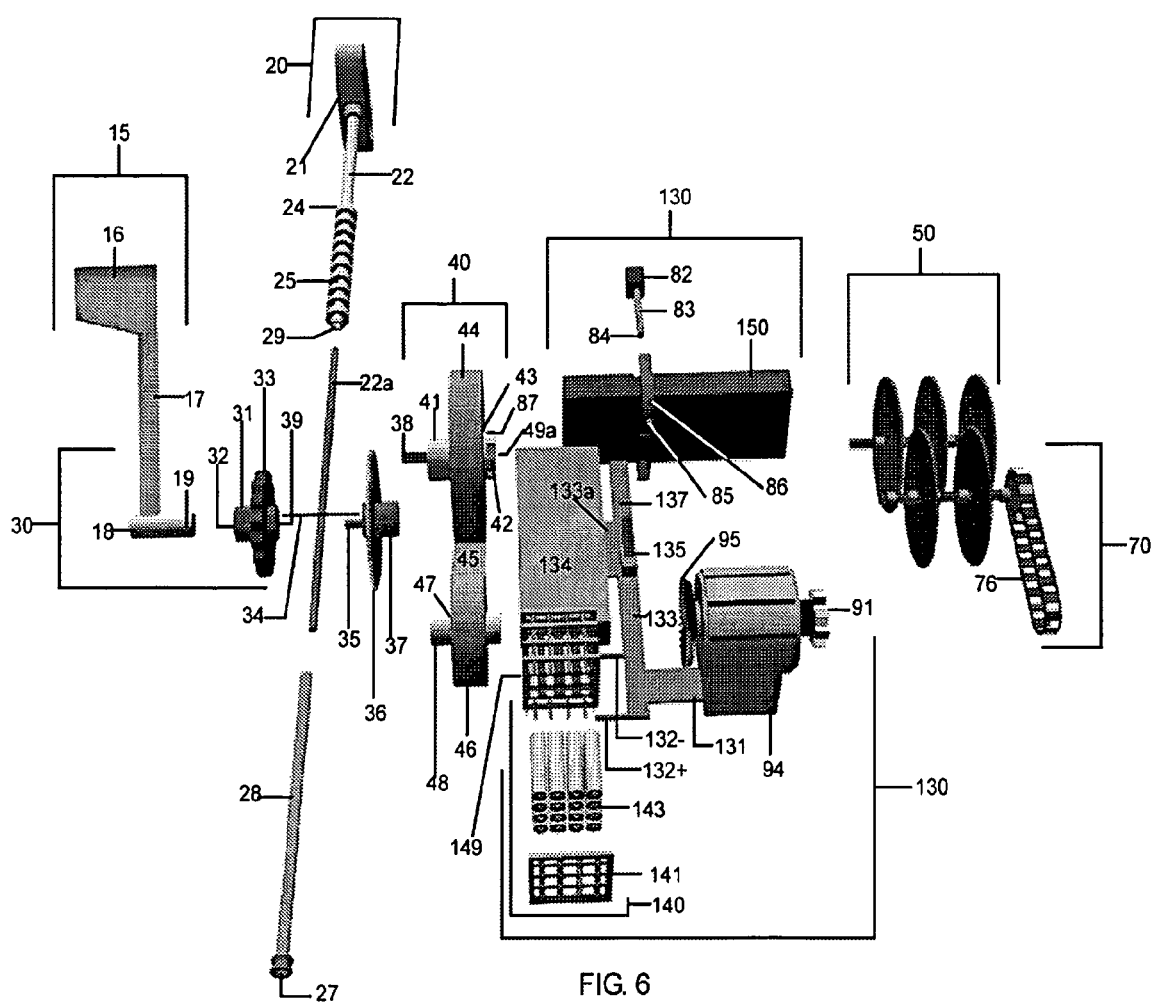
FIG. 6: Exploded View of Invention
Figure 7:
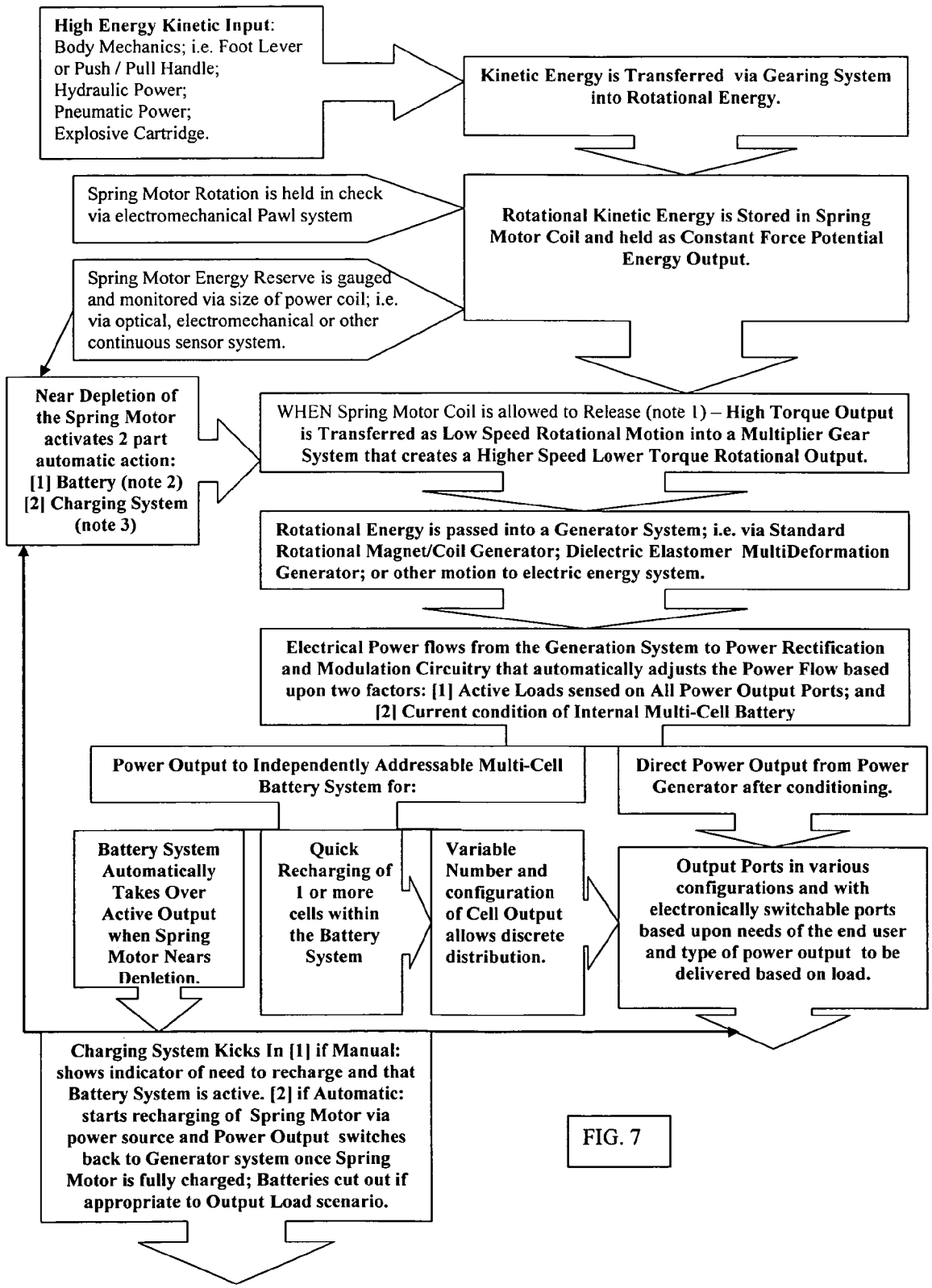
FIG. 7: Flow Chart showing the Operation of Invention
Figure 8:
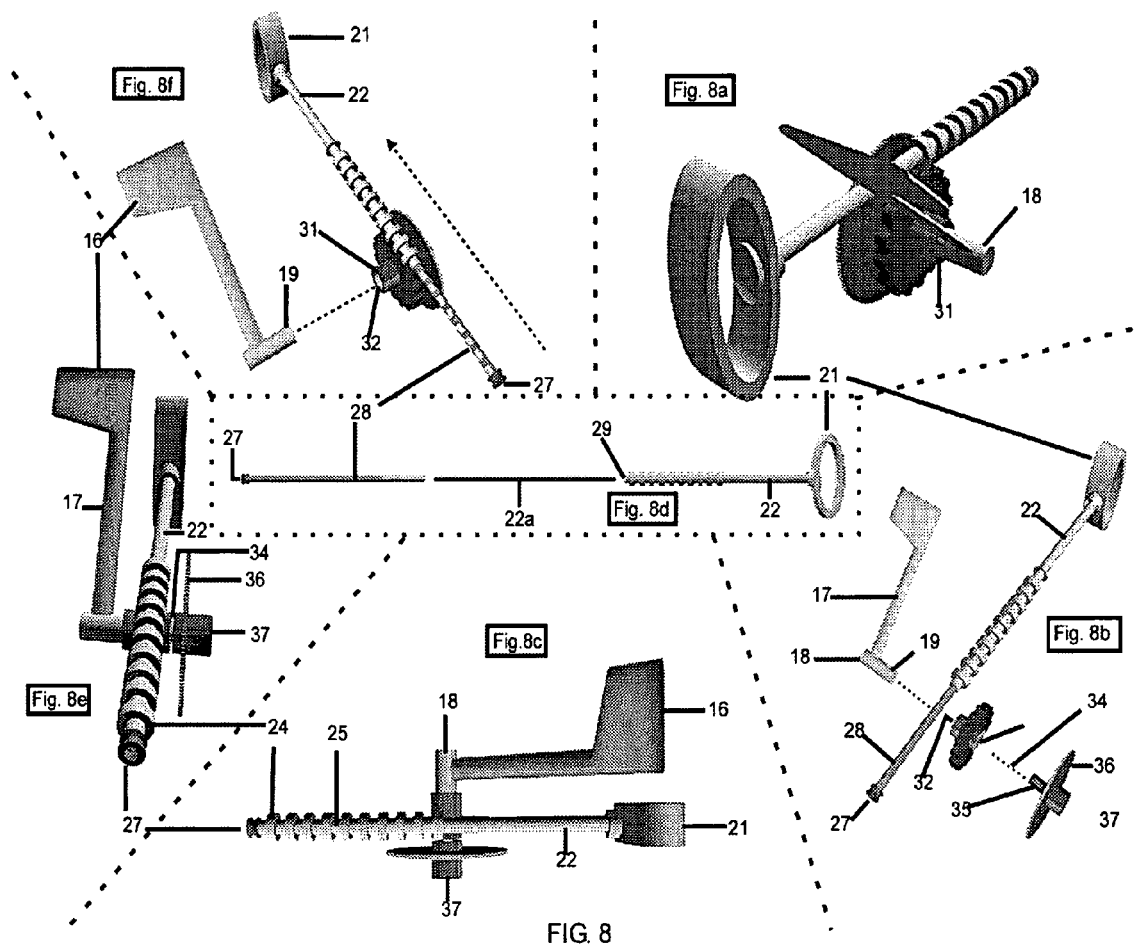
FIG. 8: Multiple views and exploded view of Power Input System

Foot Lever Assembly 15 (as shown in FIGS. 1 to 5) is in the raised starting position with its Foot Pad 16, a flattened roughly rectangular pad, shown offset to the side away from the main body of Invention 10, and attached to the end of tubular extension Lever Shaft 17. Lever Shaft 17 intersects with, and terminates at, a perpendicular connection with one end of tubular Connector Rod 18. The opposite end of, away from the intersection of Input Gear Hub Hex Cavity 32 on, tubular Connector Rod 18 is Lever Attachment Hex Shaft 19 that is linearly parallel with and an extension of Connector Rod 18. Lever Attachment Hex Shaft 19 is shown slideably insertable (in FIG. 8f) and shown inserted (in FIG. 1) into the Input Gear Hub Hex Cavity 32 that is at the center of Input Gear Hub 31 (shown in FIG. 8f). Input Gear Hub 31 (as shown in FIG. 6 exploded view) is the central axis and support structure for Power Input Gear 33. Input Gear Hub 31 is supported in Support Structure 100 Outer Wall Hole 111 (shown in FIG. 3) that allows Input Gear Hub 31 to rotate freely. The opposite end of tubular Input Gear Hub 31, as it passes through and is integral to the Power Input Gear 33, has a hex shaped Power Transfer Shaft Socket 39 (as shown in FIG. 8b and FIG. 6 exploded view). Socket 39 (FIG. 8b) is compatible with, and linearly slideable on, Input Power Transfer Shaft 35 (FIG. 8b) that is the axis of, and centrally protruding from, Power Transfer Gear 36. Power Transfer Hub 37 is the opposite end of, and axis centrally protruding from, Power Transfer Gear 36. When Input Power Transfer Shaft 35 is inserted into Shaft Socket 39 the space between the adjacent parallel surfaces of the two components (Power Input Gear 33 and Power Transfer Gear 36) is called the Hub Gap 34 (shown in FIG. 1). The Power Transfer Shaft Socket 39 of Power Input Gear 33 is a ratchet or freewheeling mechanism that allows the Power Input Gear 33 to rotate the Power Transfer Gear 36 in a forward direction via Power Transfer Shaft 35 when the Foot Lever Assembly 15 has pressure applied to it and causes a rotation of Input Gear Hub 31 and Power Input Gear 33. When pressure is released from Foot Lever Assembly 15 after it has moved Lever Attachment Hex Shaft 19 in a partial arc, the Foot Lever Assembly 15 and Power Input Gear 33 will return to their original elevated position by Torsion Spring 32a that resides within the housing of Input Gear Hub 31. The return of Foot Lever Assembly 15 and Power Input Gear 33 by Torsion Spring 32a does not reverse rotate Power Transfer Shaft 35 because of a one-way ratchet or freewheeling function of Power Transfer Shaft Socket 39, thus leaving Power Transfer Gear 36 in the position it was advanced to by the initial rotation of Power Transfer Shaft 35 in Power Transfer Shaft Socket 39.

The combined components attached to Power Input Gear 33 and Power Transfer Gear 36 are called the Power Input Gear System 30 which is supported by Input Gear Hub 31 and Power Transfer Hub 37 in holes that allow their free rotation in Support Structure 100.

Figure 3:
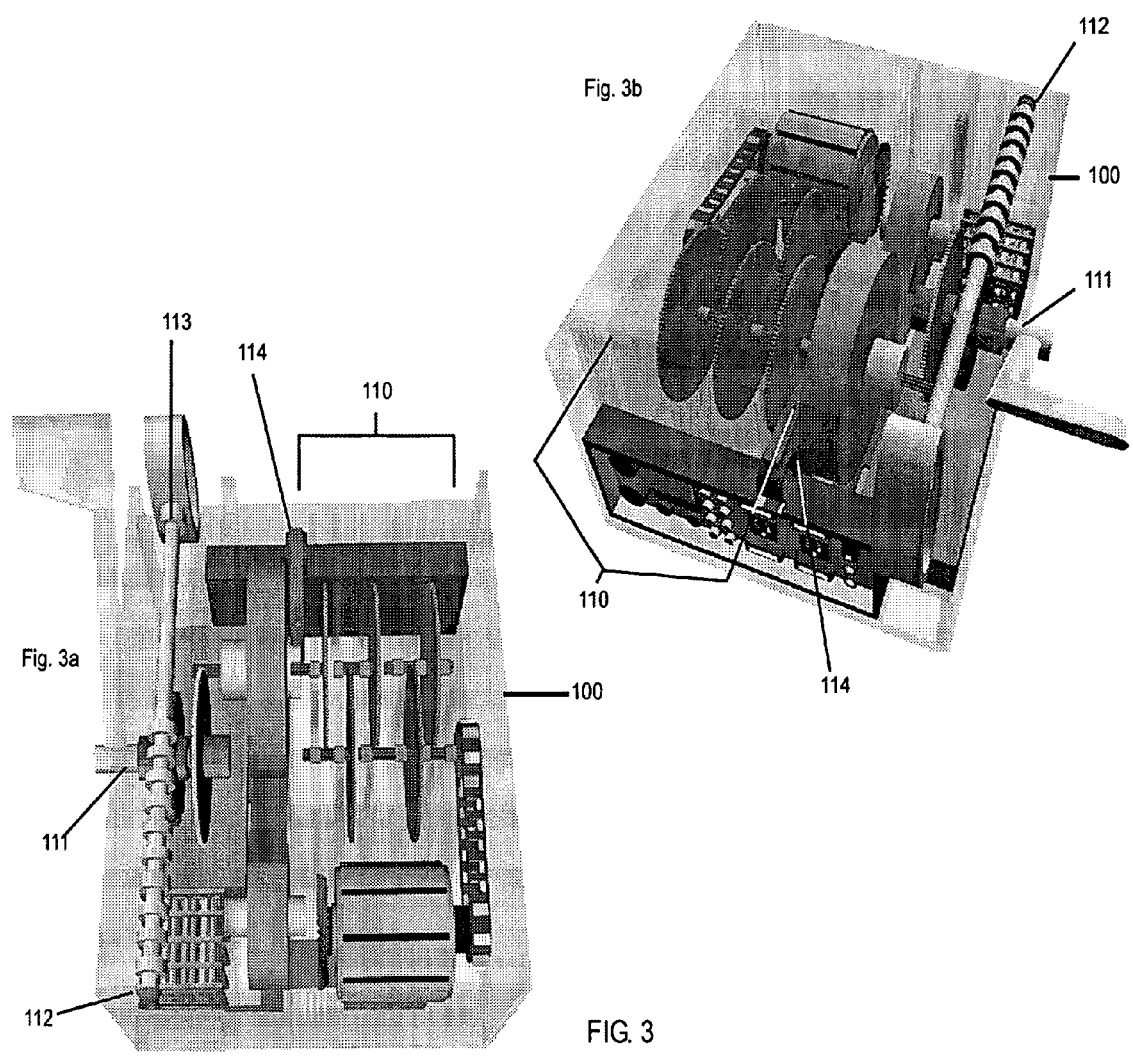
FIG. 3: Multiple Figures of Invention with shadow view of Support Structure

FIG. 1 further shows Piston Assembly 20 disposed in a resting position with Piston Shaft 22 passing through Support Structure 100 via Piston Support Hole 113 (shown in FIG. 3). Piston Handle 21 is shown in a resting position on the end of Piston Shaft 22. Piston Gear Tooth Segments 24 and the accompanying Piston Gear Recess Segments 25 are shown at rest over and meshing with the teeth on Power Input Gear 33. Piston Shaft 22 via Piston Gear Tooth Segments 24 (and the accompanying Piston Gear Recess Segments 25) is moved forward and backward with the relative motion of the teeth of Power Input Gear 33 intersecting with the Tooth Segments 24 of Piston Shaft 22 as Power Input Gear 33 is manipulated by the rotational action of Foot Lever Assembly 15. The Piston Handle 21 can be pulled forward by hand (away from the body of Invention 10) to rotate Power Input Gear 33 and wind Power Transfer Gear 36. The return of Piston Shaft 22 back through Hole 113 (FIG. 3) to its retracted position is accomplished by the action of Torsion Spring 32a and can be supplemented by the hand pressure of the user. The return of the Piston Shaft 22 to its original position via the rewinding of Power Input Gear 33 by the Torsion Spring 32a has no reverse wind effect on the Power Transfer Gear 36 as described above.

Figure 2:
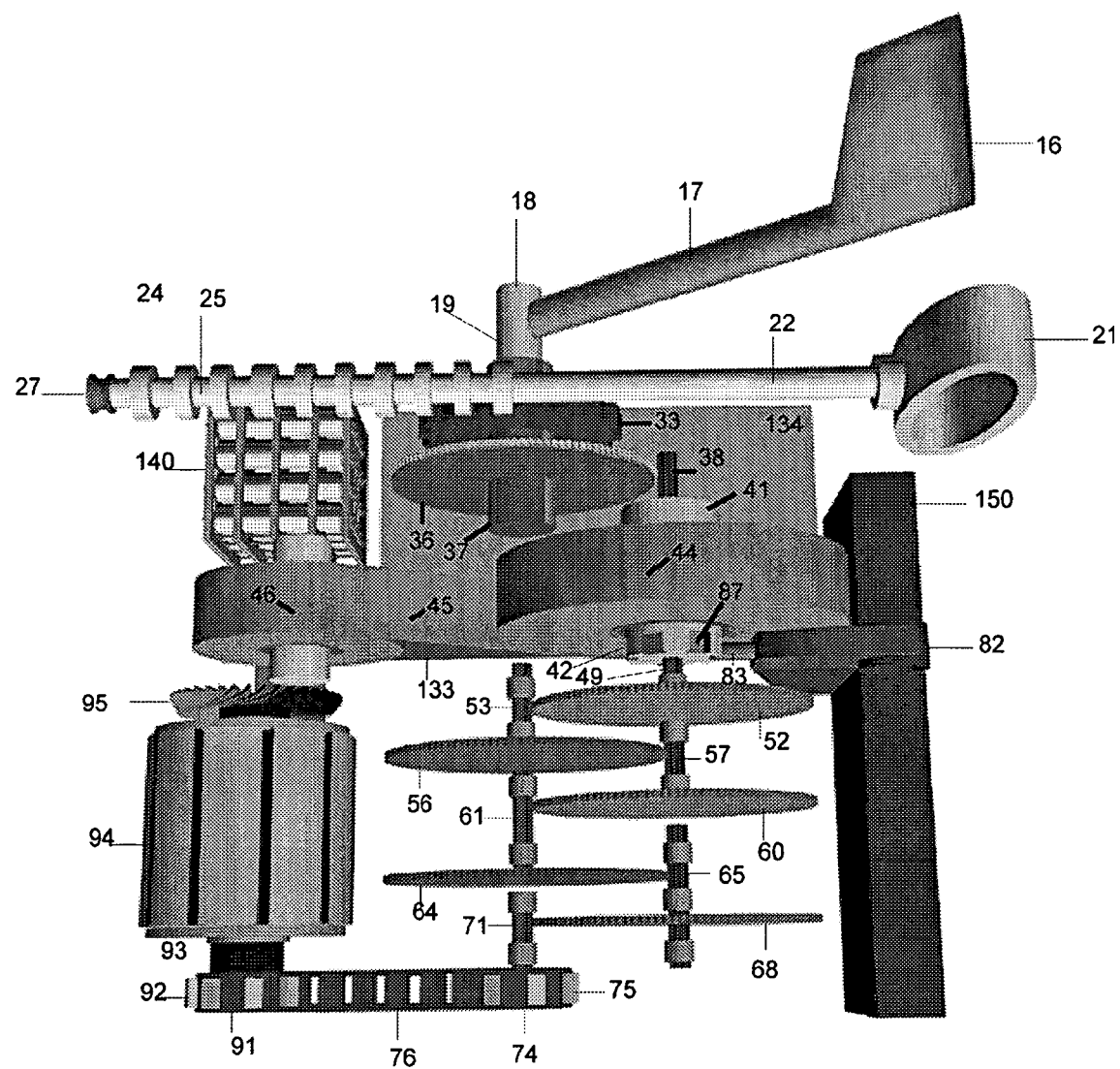
FIG. 2: Overhead Gears and Generator Side view of Invention without Support Structure

FIG. 6 shows Piston Shaft 22 is part of a three part piston design that constitutes the moving members of Piston Assembly 20. The Piston Assembly 20 is composed of Piston Shaft Guide Tube 28, Piston Shaft Core Rod 22a and Piston Shaft 22. Piston Shaft Guide Tube 28 is a hollow tube and is integral to and terminates at Piston Shaft Boss 27 (shown in FIGS. 6 and 8f/8b) which is connected to Support Structure 100 at support Hole 112 (shown in FIG. 3). In assembly Piston Shaft Core Rod 22a is slideably receivable within Shaft Guide Tube 28 (shown in FIGS. 8f & 8b). Piston Shaft Core Rod 22a is centered (both linearly and concentrically) inside Piston Shaft 22 and attached to Piston Shaft 22 at its Attachment End 22c where it screws into the forward interior of Piston Handle 21. Piston Shaft 22 with Piston Shaft Core Rod 22a positioned inside forms a concentric annular pathway between the interior walls of Piston Shaft 22 and the outer walls of Piston Shaft Core Rod 22a. This concentric annular pathway allows the combined parts of Piston Shaft 22 and Piston Shaft Core Rod 22a to accept the Shaft Guide Tube 28 so that Piston Shaft Guide Tube 28 passes around the diameter of Piston Shaft Core Rod 22a and inside the interior diameter of Piston Shaft 22 forming a linearly slideable assembly where Shaft Guide Tube 28 remains stationary while Piston Shaft 22 with its interior Piston Shaft Core Rod 22a can move linearly. The Seal End 22b of Piston Shaft Core Rod 22a moves away from the Piston Shaft Boss 27 at the open end of Shaft Guide Tube 28 when Piston Handle 21 is pulled or other energy is ported into the Piston Shaft Boss 27. The Seal End 22b of Piston Shaft Core Rod 22a returns to its position at the opening of the Piston Shaft Boss 27 at the open end of Shaft Guide Tube 28 when Piston Handle 21 is returned to its resting position as shown in FIGS. 1 & 2.

The motion of Piston Shaft 22 can be accomplished via at least three methods. Two of these methods are described above (by rotation of Foot Lever Assembly 15 or by the pulling of Piston Assembly 20 by Piston Handle 21). The third methodology for the motion of the Piston Shaft 22 is the introduction of a physical object pressure, or pneumatic, hydraulic or explosive gas pressure into the Piston Shaft Guide Tube 28 through Piston Shaft Boss 27 against the Seal End 22b of Piston Shaft Core Rod 22a. The introduction of said alternate pressure would move the Piston Shaft 22 forward and the release of said pressure would allow the Torsion Spring 32a to return the Piston Shaft 22 to its original resting position.

The rotation of Power Input Gear 33 by any of the methods described above in turn rotates Power Transfer Gear 36 in a wind mode rotation with no back slippage of Power Transfer Gear 36 due to its position adjacent to and interconnected with the teeth of Multiplier Gear 38. FIGS. 1 & 2 show Power Transfer Gear 36 meshing with the spline Multiplier Gear 38 that protrudes from the central axis of Wind Hub 41. Wind Hub 41 is the central axis and power input hub for the Power Reel 44 of Spring Motor Assembly 40 (shown in FIG. 6). The power input and release section of Spring Motor Assembly 40 (shown in FIG. 9) consists of Multiplier Gear 38 imbedded in, and protruding concentrically from the center of Wind Hub 41 which is separate from but linearly contiguous with Output Hub 42. Wind Hub 41 and Output Hub 42 are slideably receivable within and individually attached to the Spring Motor Hub 43 and are locked into their respective sides of the hub via integral locking pins. Each side of the hub (Wind Hub 41 and Output Hub 42) of the Spring Motor Power Reel 44 act separately to allow winding energy to pass into and out of the Spring Motor Hub 43. Wind Hub 41 rotates Spring Motor Hub 43 via the action of Power Transfer Gear 36 turning Multiplier Gear 38. Wind Hub 41 transfers power to rotate Spring Motor Hub 43 in the direction to wind the Spring Motor Power Reel 44 of Spring Motor Assembly 40 so that additional windings of the continuous spring band 45 are wound around the Spring Motor Power Reel 44. Output Hub 42 ratchet or freewheels freely and remains stationary while Wind Hub 41 rotates Spring Motor Hub 43 and Spring Motor Power Reel 44 in the direction to wind power into Spring Motor Assembly 40. When Output Hub 42 is used to release the power from the Spring Motor Assembly 40 then Wind Hub 41 ratchets or freewheels freely and remains stationary while allowing the Spring Motor Assembly 40 to release its stored power via Output Hub 42 into Output Gear Assembly 50. Both the Wind Hub 41 and Output Hub 42 act as the support shaft for Spring Motor Hub 43 on which is mounted Spring Motor Power Reel 44. Wind Hub 41 and Output Hub 42 support Spring Motor Hub 43 and Spring Motor Power Reel 44 via support holes in which they freely rotate between Support Structure 100 Walls.

FIGS. 1 to 6 further shows Spring Motor Assembly 40 as a constant torque Spring Motor, which is a compact spring device which consists of a Rewind Reel 46 that has a length of coiled linear spring wound around its Rewind Reel Hub 47 axis's core, and a larger diameter Spring Motor Power Reel 44 where the other end of the linear constant force spring is attached to the Spring Motor Hub 43 drum of the Spring Motor Power Reel 44. The two coils are mounted on two separate axes (Wind Hub 41/Output Hub 42 and Rewind Reel Support Rod 48) that are parallel to each other so that the axis of each of their core drums (Spring Motor Hub 43 and Rewind Reel Hub 47) is perpendicular to the linear spring and rotation of the two coils. The motor spring power source is the Rewind Reel 46 (or take-up reel) which is free to rotate on Rewind Reel Support Rod 48 and its other end is attached to the Spring Motor Power Reel 44 (or output drum). When the Multiplier Gear 38 that is attached to the Wind Hub 41 of the Spring Motor Power Reel 44 is rotated so that a length of the linear spring is drawn from the Rewind Reel 46 to the Spring Motor Power Reel 44, the spring is pulled straight in the area between the two coils (known as the Spring Motor Reverse Tension Band 45) and then wound onto the Spring Motor Power Reel 44 by bending it against its natural spring curvature, thereby storing energy in the spring. Spring Motor Reverse Tension Band 45 is the material passing through the power zone between the two reels and is the only materials changing stress. The energy is stored in a passive state in the reconfigured spring that is wound on the Spring Motor Power Reel 44.

Figure 4:
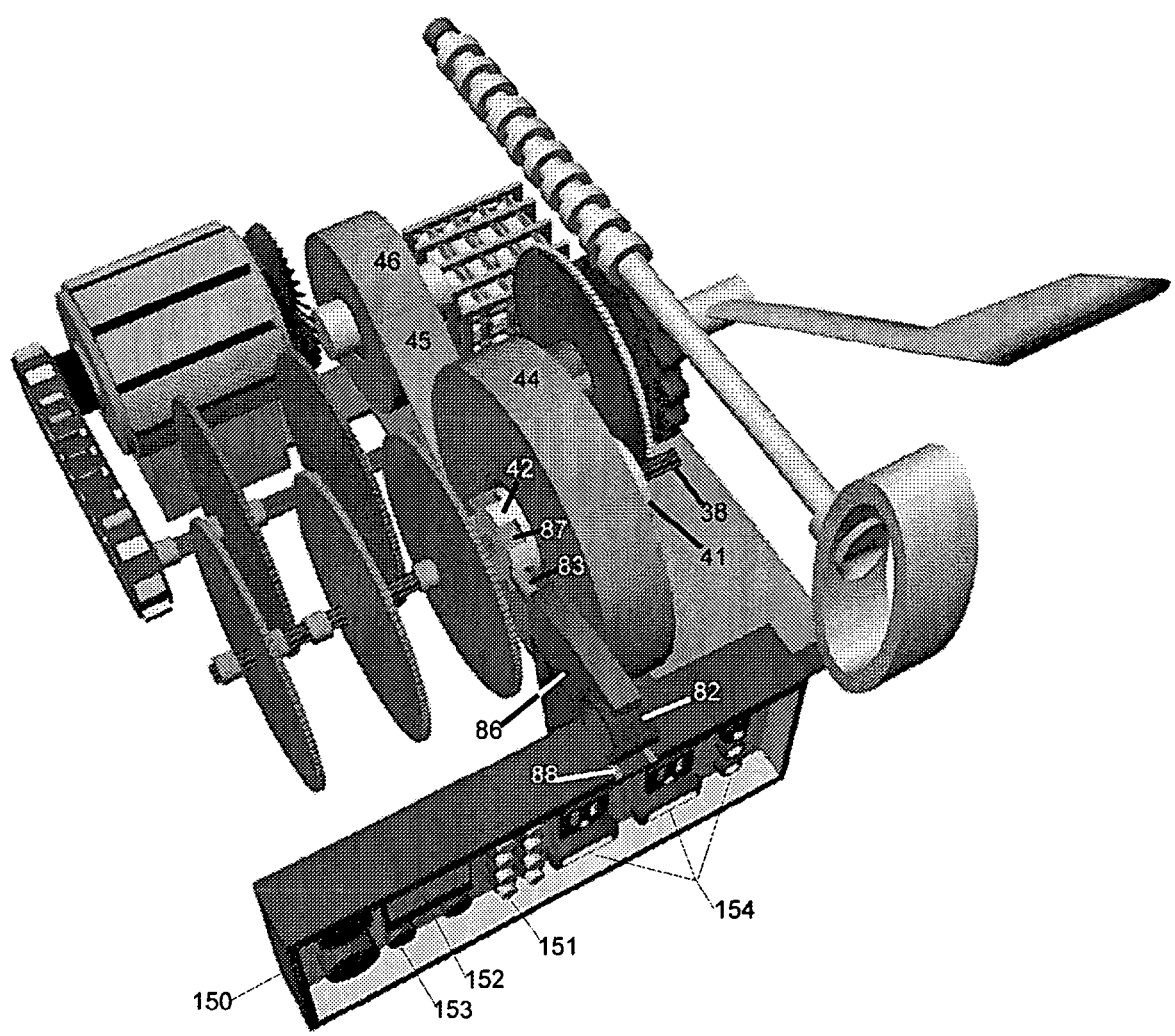
FIG. 4: Overhead Front Control Panel view of Invention without Support Structure
Figure 5:
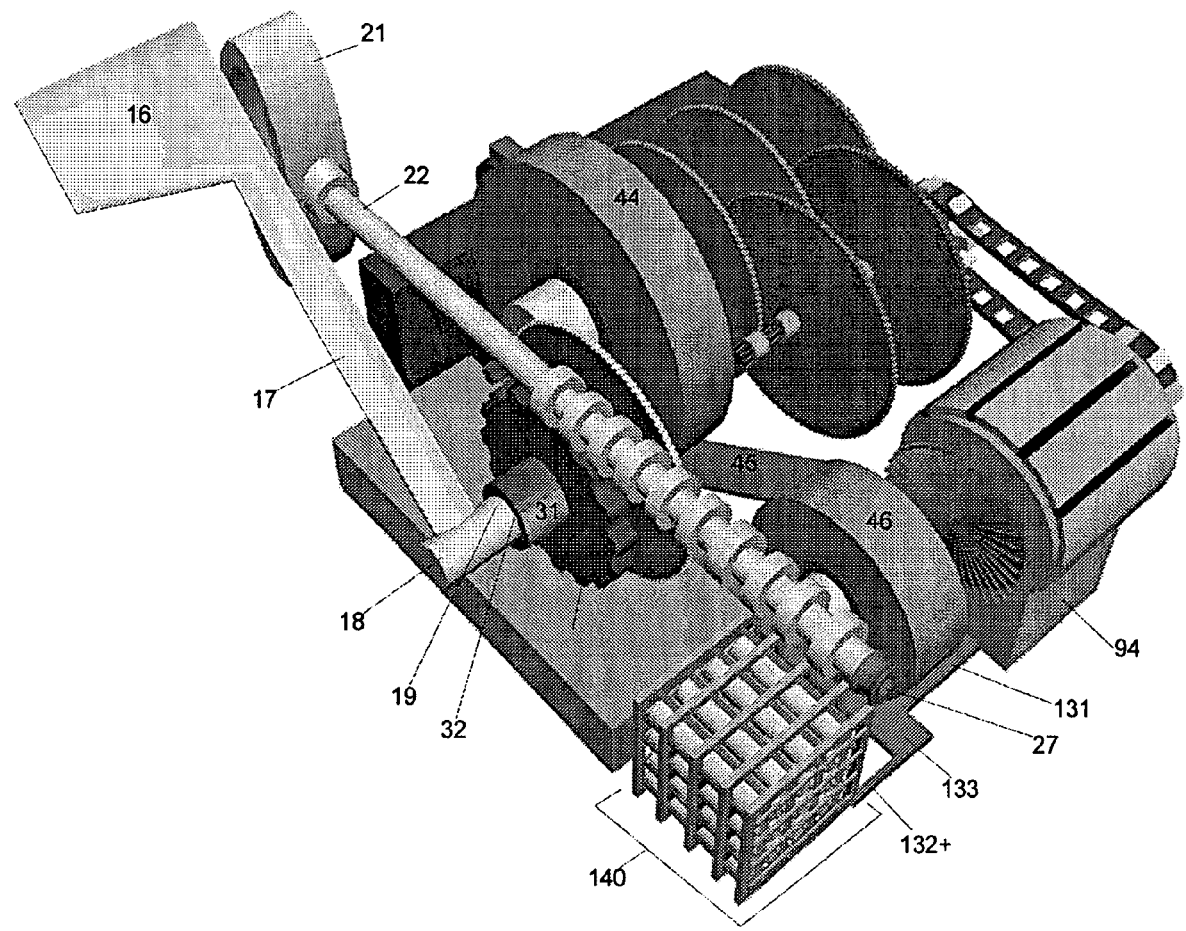
FIG. 5: Overhead Power Input Side view of Invention without Support Structure
Figure 9:
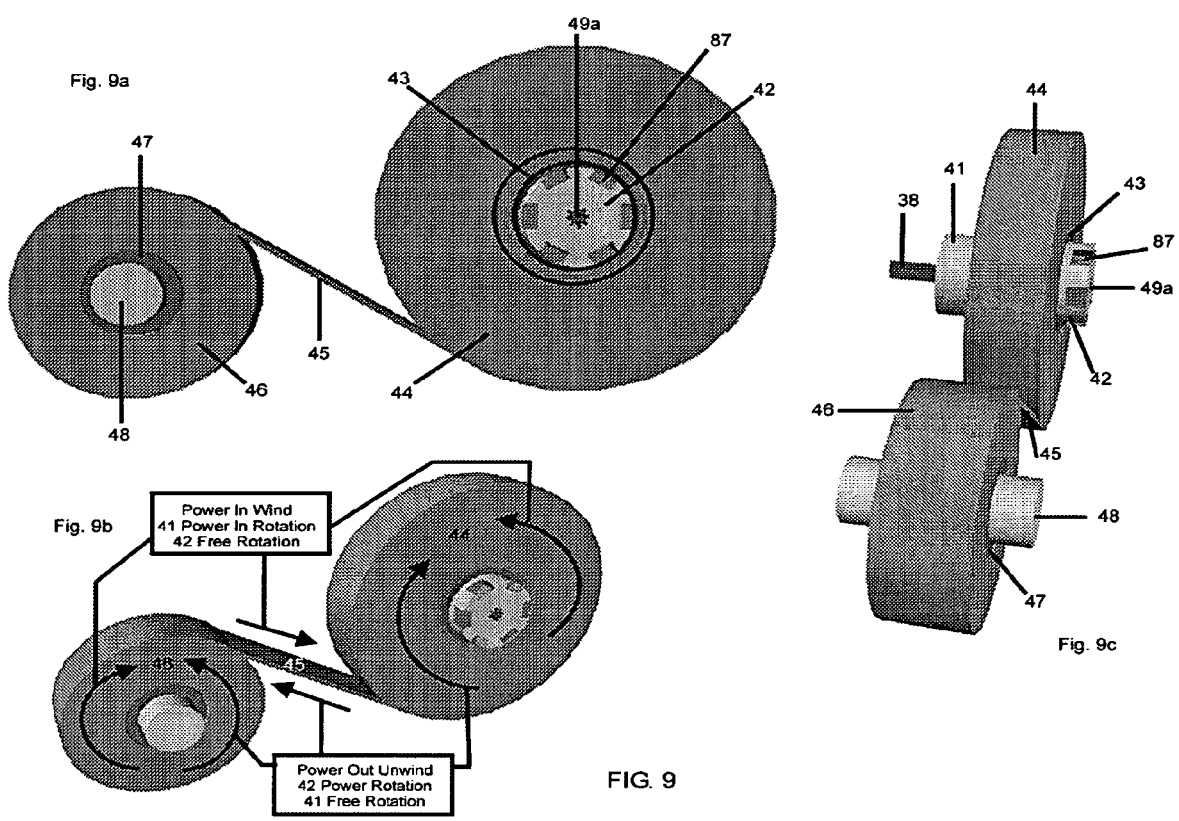
FIG. 9: Multiple views Spring Motor Reels

Output Hub 42, as shown in FIG. 4 and FIG. 9, has Detents 87 equilaterally spaced around its circumference. FIG. 4 also shows Pawl Rod 83 held rigid and perpendicular to the axis of Output Hub 42 by Pawl Servo Mechanism 86 so that Pawl Tip 84 of Pawl Rod 83 is in contact with the Detent 87 of Output Hub 42. Pawl Rod 83 is held in place by Pawl Servo Mechanism 86 to prevent rotation of Output Hub 42. Pawl Rod 83 can be retracted in two ways. Pawl Rod 83 can be withdrawn manually by pulling Pawl Grip Ring 82 (shown in detent lock position) so that it is moved into position where it is held by the Retention Notch 88 on the surface of Control Box 150. This Pulled-back Pawl Grip Ring Position 89, shown in FIG. 12a, retracts the Pawl Rod 83 away from Output Hub 42 so that Pawl Tip 84 is no longer in contact with Detents 87 of Output Hub 42. The Pawl Tip 84 is withdrawn back into Slide Hole 85 of Servo Mechanism 86 and held in the Pulled-back Pawl Grip Ring Position 89. The same Pulled-back Pawl Grip Ring Position 89 can be automatically achieve via electronic activation of the linear motor Servo Mechanism 86 by electrical impulse command from the Power Management System 134.

Figure 12:
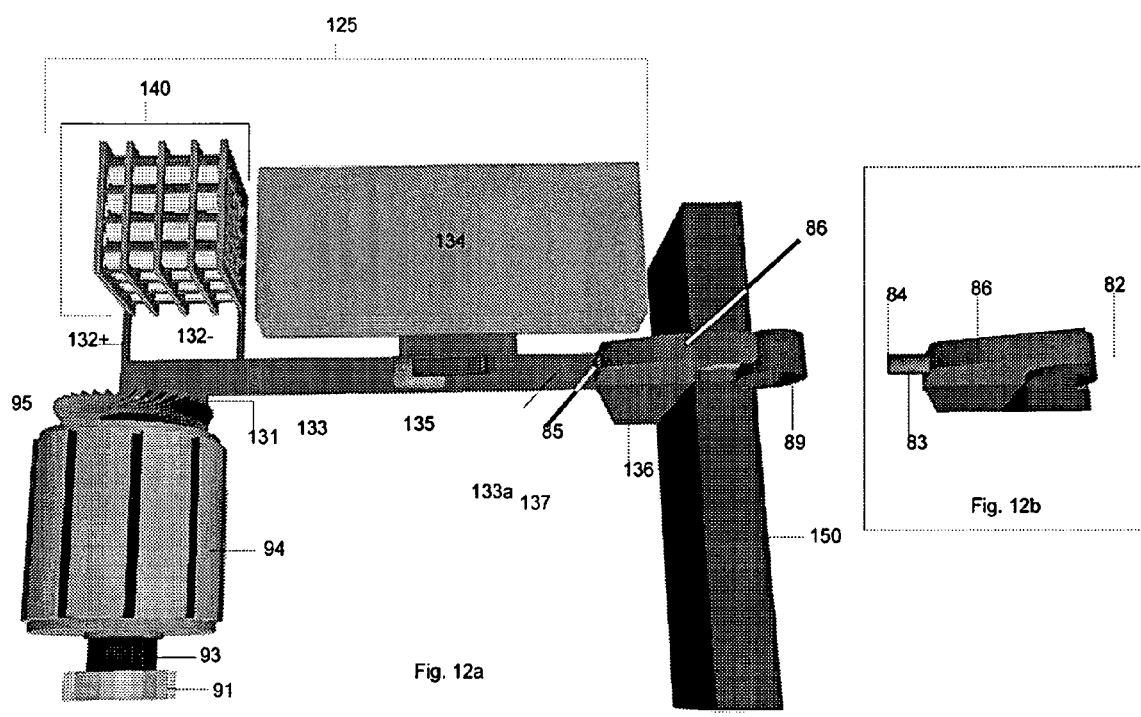
FIG. 12: Overhead Generator Side of Electrical System

As shown in FIG. 12, the Pawl Activation Circuitry 165 of Power Management System 134 can activate the internal linear motion of the Pawl Rod 83 via signals transmitted through the PMS/IBS Control Box Cables 137 to the Servo Mechanism 86. The Servo Mechanism 86 can be made via the electrical command from the Pawl Activation Circuitry 165 of Power Management System 134 to cause the Pawl Rod 83 to retract to the Pulled-back Pawl Grip Ring Position 89 as shown in FIG. 12a or to be pushed forward, as shown in FIG. 12b and FIG. 4 to cause the Pawl Rod 83 to have its Pawl Tip 84 moved into contact with the Output Hub 42 where it will become inserted within the Detents 87 as the unrestrained motion of Output Hub 42 rotates the Detents 87 into position where Pawl Tip 84 can enter Detents 87 of Output Hub 42.

The positioning of the Pawl Rod 83 by Servo Mechanism 86 is part of the power management logic system integral to Power Management System 134. The release of Output Hub 42 via the Pawl Activation Circuitry 165 retraction of the Pawl Rod 83 by Servo Mechanism 86 allows the Output Hub 42 to transfer energy from the Spring Motor Assembly 40 into the Output Gear Assembly 50.

NOTE: The release of this rotational energy from Output Hub 42 will, through the balance of Invention 10, leads directly to the creation of electrical power (through means to be discussed). The decision by the Pawl Activation Circuitry 165 of the Power Management System 134 to lock or release the rotational energy of Output Hub 42 can be for several reasons including the sensed need by Power Reel Status Circuitry 164 for recharging of the Spring Motor Assembly 40, the sensed need by the Load Sensor Circuitry 163 for a direct application of the generated electrical power to an electrical load connected to the control panel, or the sensed need by the Recharge Circuitry 163 for recharging of electrical power to other power storage components of the Invention 10. The decision to create or manipulate power is processed by the logic circuitry of the Power Management System 134 which arrives at this decision via conglomeration of data received by the various sensor circuits within the Invention 10.

The release of Pawl Tip 84 from Detents 87 allows the Output Hub 42 of Spring Motor Assembly 40 to rotate causing Spring Motor Speed Spline One 49 (shown in FIGS. 11 & 12) to rotate. Spring Motor Speed Spline One 49 connects into Output Hub 42 via Spline One Socket 49*a* at the center of Output Hub 42 (as shown in exploded FIG. 6).

FIG. 1, FIG. 2, FIG. 6 and FIG. 11 further shows an Output Gear Assembly 50 that is composed of a gear train starting with Spring Motor Speed Spline One 49 that is parallel with and attached to the central axis of the Output Hub 42 via Spline One Socket 49*a*. Each of the gears in the gear train that make up the Output Gear Assembly 50 can be configured as a smaller Speed Spline Gear (items 49, 53, 57, 61, 65 and 71) attached to the central hub of a larger diameter Speed Gear (items 52, 56, 60, 64 and 68). In this example, each Speed Spline Gear has 10 teeth on its linear radial structure. Also as shown in this example, each Speed Gear has 50 teeth on the edge of its flat disk structure. This configuration produces a speed increasing structure by virtue of the smaller Speed Spline Gears rotating the hubs of the larger Speed Gears. The Output Gear Assembly 50 as shown works to increase speed as it decrease the torque of the rotary motion. The Output Gear Assembly 50, as shown works as follows: Speed Spline Gear One 49 is rotated by the Output Hub 42 at 1 revolution per minute (1 rpm). This creates a rotary motion of the Speed Gear One 52 at 1 rpm. The meshing of Speed Gear One 52 with Speed Spline Gear Two 53 causes Speed Spline Gear Two 53 to rotate 5 rpm (due to the 50:10 gear ratio between the two parts). Speed Spline Gear Two 53 rotates Speed Gear Two 56 at 5 rpm. Speed Gear Two 56 meshes with Speed Spline Gear Three 57. Speed Spline Gear Three 57 turns at 25 rpm. Speed Spline Gear Three 57 rotates the hub of Speed Gear Three 60 at 25 rpm. Speed Gear Three 60 meshes with Speed Spline Four Gear 61. Speed Spline Gear Four 61 turns at 125 rpm. Speed Spline Gear Four 61 turns the hub of Speed Gear Four 64. Speed Gear Three 64 meshes with Speed Spline Gear Five 65. Speed Spline Gear Five 65 turns at 625 rpm. Speed Spline Gear Five 65 rotates the hub of Speed Gear Five 68 at 625 rpm. Speed Gear Five 68 meshes with Speed Spline Gear Six 71 and causes Speed Spline Gear Six 71 to rotate at 3125 rpm. Any arrangement of gear teeth and number of gears can be used to achieve the proper speed and torque for the operation of work components attached to the Invention 10. All Speed Spline Gears (items 49, 53, 57, 61, 65 and 71) and the corresponding Speed Gears (items 52, 56, 60, 64 and 68) are supported within the Support Structure 100 Walls by minimal friction Support Bearings A, B, C, D, E, F, G, H, I, J, K & L (items 51, 54, 55, 58, 59, 62, 63, 66, 67, 69, 72 & 73).

FIG. 1, FIG. 2 and FIG. 11*a* and 11*b* further shows Speed Spline 71 axially intersecting the hub, and acting as the driving component of Drive Belt Gear 74. Drive Belt Gear 74 is connected to a flexible loop Drive Belt 76 that has Drive Belt Holes 77 that are aligned with and interlock with the Drive Gear Teeth 75. The rotation of the Drive Belt Gear 74 creates a continuous loop motion in the Drive Belt 76. Drive Belt 76 is connected at the opposite end of its continuous loop with the Generator System 90. Drive Belt 76 is connected to and loops around Generator Gear 92 with Generator Gear Teeth 92 meshing with the Drive Belt Holes 77. The motion of the Drive Belt 76 causes Generator Gear 91 to rotate Generator Shaft 93 at the same speed as the Drive Belt Gear 74 creating a rotation of the energy producing components integral to Generator Housing 94 of Generator System 90. A direct gear to gear drive between Drive Belt Gear 74 and Generator Gear 91 can also be used instead of a belt drive.

Figure 13:
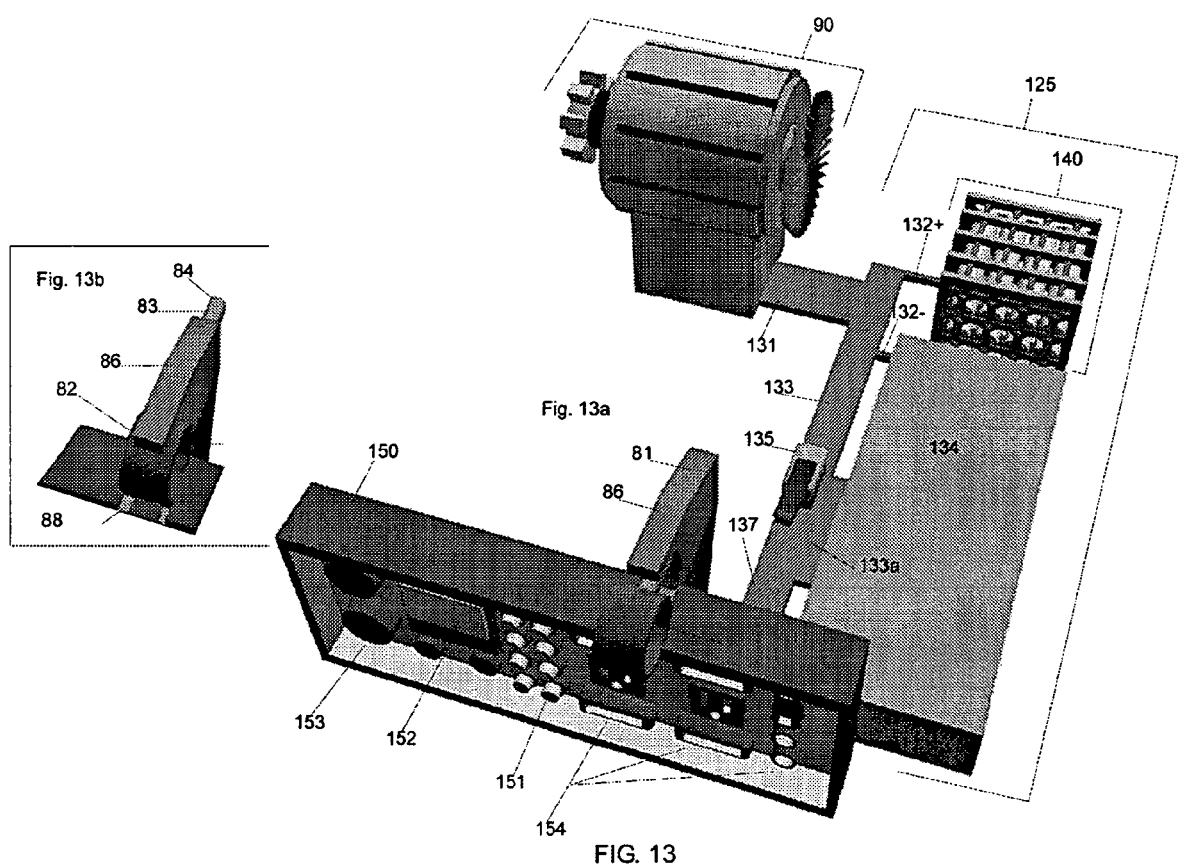
FIG. 13: Overhead Front Control Panel view of Electrical System

The electrical power components of Invention 10 are shown in FIG. 12 and FIG. 13. The rotation of the Generator Shaft 93 of Generator 90 creates electrical current to be generated. The current is transferred via Generator Output Cables 131 to the Main Power System Cables 133 that connect all components of the Invention 10 electrical system. FIG. 13 shows the Generated Power Flow (dashed line) 160 enters the Power Management System 134 box where it is managed and conditioned for use within the system. Depending upon several factors, the power can be routed to one or more locations integral to the Electrical System 130 of Invention 10. Each routing scenario is described below:

An Electrical Load 161 is attached to a Power Outlet 154 (as shown in FIG. 13) of Control Box 150. The Load Sensor Circuitry 162 of Power Management System 134 senses the Electrical Load 161 and prepares to provide power to the Power Outlet 154. The Power Outlet 154 with the Electrical Load 161 attached is controlled by one of the Outlet Activation Buttons 151 on Control Box 150. When the Outlet Activation Button 151 connected to the Power Outlet 154 with the Electrical Load 161 is activated, the Power Management System 134 determines the availability of power within the system that is capable of handling the Electrical Load 161. The power sources available to the Power Management System 134 are the Generator 90 and the rechargeable Battery Pack 140. The availability of instantaneous power will come from the rechargeable Battery Pack 140. The rechargeable Battery Pack 140 is composed of a number of batteries (12 are shown in this version) that are wired together to provide a source of power for an Electrical Load 161 that is attached to the system. Utilizing a set of standard rechargeable batteries as the Battery Pack 140, the Power Management System 134 allows power to be transferred from the rechargeable Battery Pack 140 through positive 132*a* and negative 132*b* cables into the main Power System Cables 133 to the Control Box Cables 137 that feed the Power Outlets 154. The drain of energy from the rechargeable Battery Pack 140 is sensed by the Recharge Circuitry 163 of the Power Management System 134 which senses a lowered power signature in the battery pack causes it to review the position of the Micro Sensor Switch 135 under the Power Reel 44 of Spring Motor Assembly 40.

Figure 10:
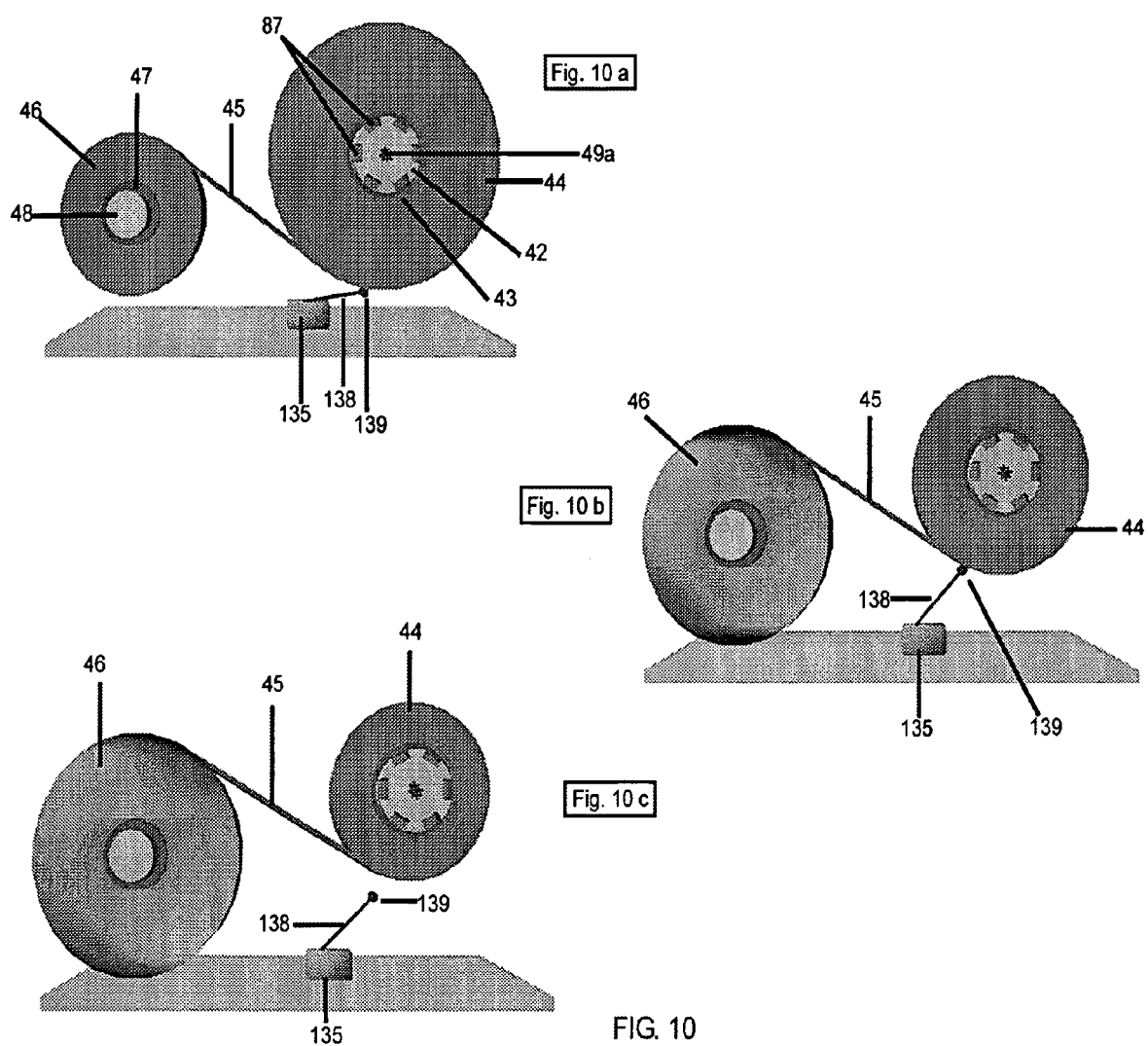
FIG. 10: Multiple views Spring Motor Reels and Sensor

As shown in FIG. 10, as the diameter of the Spring Motor Power Reel 44 determines the position of the Micro Sensor Switch 135. FIG. 10b shows the diameter of the Spring Motor Power Reel 44 decreases as it unwinds generating power via the rotation of the Output Hub 42 into the Gear System 50 and Generator System 90. The spring loaded Shaft 138 with Roller Head 139 of the Micro Sensor Switch 135 moves upward with the depletion of the coils of spring material from the Spring Motor Power Reel 44. When the Spring Reel 44 is depleted past the point of usefulness, as shown in FIG. 10c, the Roller Head 139 no long has any pressure applied to it by the Power Reel 44 causing no tension on the Shaft 138 and in-turn causing a "fully depleted" signal to be sent via the Micro Sensor Switch 135 to the Power Reel Status Circuitry 164 of Power Management System 134. Conversely, as the Power Coil 44 is wound, the coils of spring material on the Power Coil 44 increase in diameter (FIG. 10a) causing the Roller Head 139 to move the Shaft 138 into a fully lowered position on the Micro Sensor Switch 135 indicating to the Power Reel Status Circuitry 164 of Power Management System 134 that the Spring Motor Assembly 40 is fully charged and ready to output power. The position of the Shaft 138 of the Micro Sensor Switch 135 is used by the Power Reel Status Circuitry 164 of Power Management System 134 as a direct indicator of the amount of power available in the Spring Motor Assembly 40.

If the Micro Sensor Switch 135 tells the Power Management System 134 that there is sufficient power in the Spring Motor Assembly 40 to be useful for power generation, then the Servo Mechanism 86 is activated by the Pawl Activation Circuitry 165 of Power Management System 134 to withdraw the Pawl Shaft 83 from Detent 87 allowing the Spring Motor Assembly 40 Power Reel 44 to rotate and provide power to the Gear System 50 and Generator system 90. The Generated Power Flow 160 is then routed from the Generator system 90 into the Power Management System 134 via Main Power Cables 133. The generated power flow 160 is then conditioned and redirected into the Recharge Circuitry 163 within the Power Management System 134 for application to trickle recharge the rechargeable Battery Pack 140. In this version of the system a number of the rechargeable Batteries in the Battery Pack 140 can dispense power while others are being recharged. When the draw of the power load stops, the generated power flow 160 can continue to charge all the batteries, or selective batteries, within the rechargeable Battery Pack 140.

If the Micro Sensor Switch 135 tells Power Reel Status Circuitry 164 of the Power Management System 134 that there is insufficient power to be useful for power generation, then the Power Management System 134 can do one of several things depending upon the overall system configuration. If the system is fully manual in its recharge capability, then the Power Management System 134 will turn on a signal, a sound or flashing light (an LED for low power consumption) that would indicate to the user the need to manually recharge the Spring Motor Assembly 40 to continue the loop of power (i.e. power out of batteries to load=use of spring motor to generate power=power back into batteries or direct to load or both).

Figure 16:
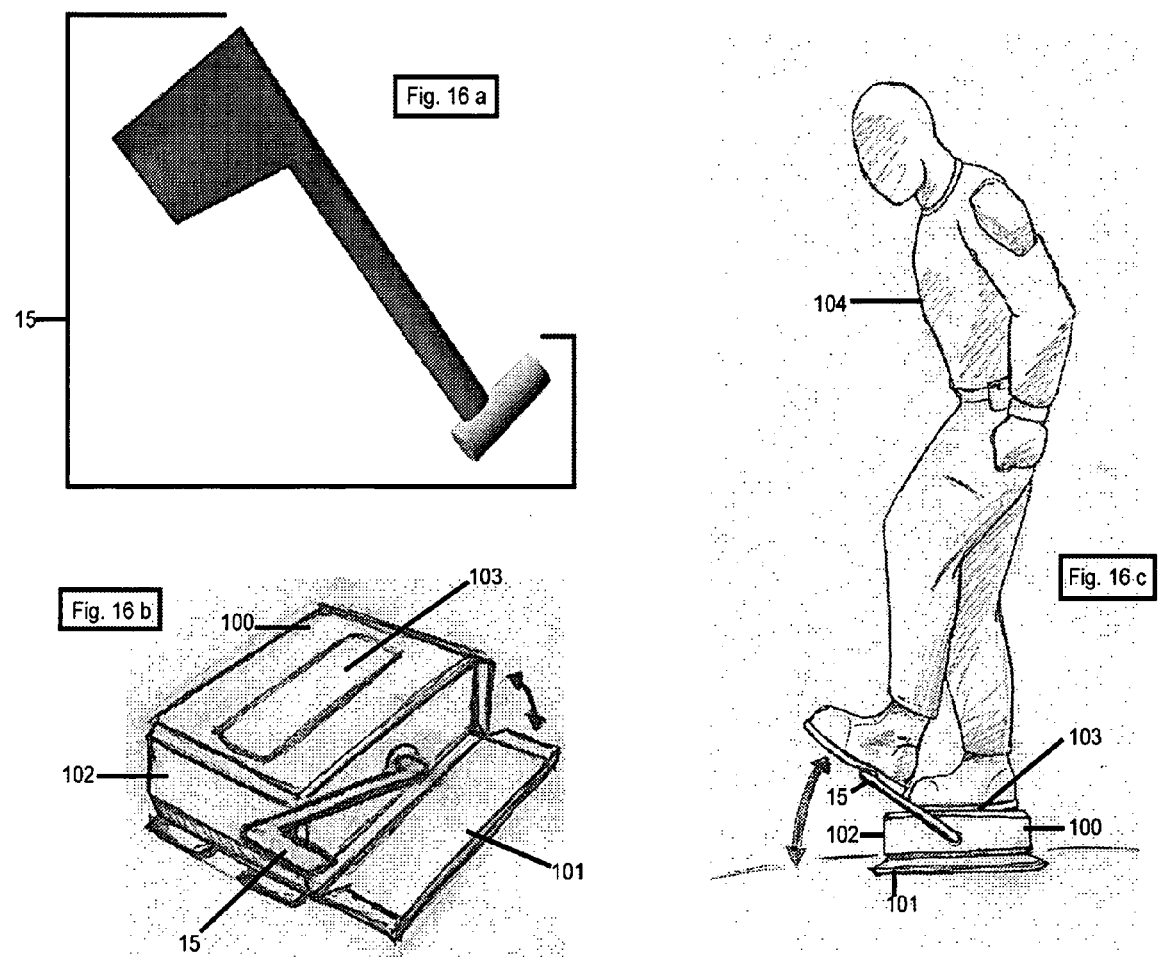
FIG. 16: Multiple views of Boxed Invention and Physical Charging of unit

As shown in FIG. 16, manual recharging of the kinetic energy would be done by using body mechanics (i.e. the foot) to depress the Foot Lever assembly 15 to rotate the mechanism of the Power Input Gear System 30 to wind the Spring Motor Assembly 40. Upon completion of the Spring Motor 40 rewinding procedure, the Micro Sensor Switch 135 will sense the recharged condition of the Spring Motor 40 and send that data to Power Reel Status Circuitry 164 which will, if appropriate to the power flow and condition of the rechargeable battery system 140, send a signal to the Pawl Activation Circuitry 165 to release the Pawl System 80 to allow kinetic energy to flow from the Spring Motor 40 into the Gear Assembly 50 to power the Generator assembly 90 which in-turn provides power to the Power Conditioning Circuitry 166 of Power Management System 134 that conditions the power appropriately and then distributes it directly to the Control Panel 150 or diverts all, or part, of the Generated Energy Flow 160 into the Recharge Circuitry 163 to recharge the Battery System 140.

If the Invention 10 has an automatic recharging system, the signal that would normally be used to alert the user that the system needs to be recharged would in-turn be used to activate the automatic recharging mechanism. An automatic recharging mechanism might use hydraulic, pneumatic, physical impact energy or explosive cartridge to deliver power to cause the Spring Motor Assembly 40 to be rewound via a direct or indirect driving mechanism that allows the one or more of the power sources (i.e. hydraulic, pneumatic, physical impact energy or explosive cartridge power) to rotate the Input Power Gear System 30 via linear or rotational power input. In this way the Invention 10 can dispense electrical power from a relatively small energy reserve, the Battery Pack 140, while still being able to deliver the power for extended periods of time due to its ability to recharge itself on-the-fly via its integral power re-generation system. This creates the perception of a high density power system because the power can be delivered at a substantial power rate for extended periods of time due to its ability to renew its internal electrical power supply via the use of the kinetic energy stored in the Spring Motor Assembly 40.

It is notable that the invention need not include an integrally included power input/generation device (i.e., a power input/generation device could be separately provided). and instead the invention may merely include a device for controlled energy storage and release. Although one large or a number of small regular rechargeable batteries can be used as the storage source of electrical power in the preferred version of Invention 10 described above, the following version of the electrical system of the Invention 10 describes an "Intelligent Battery System" (or IBS) 120 that provides an advanced methodology of distributing, charging and managing the limited battery power available in Invention 10. The functionality of the IBS 120 is a coordinated effort between the Battery System 140 and the Power Management System 134. It is intended to maximize the use of all batteries within the system by making their attributes available to the system in a manner that creates multiple scenarios of use based upon the configuration of the IBS 120.

Figure 14:
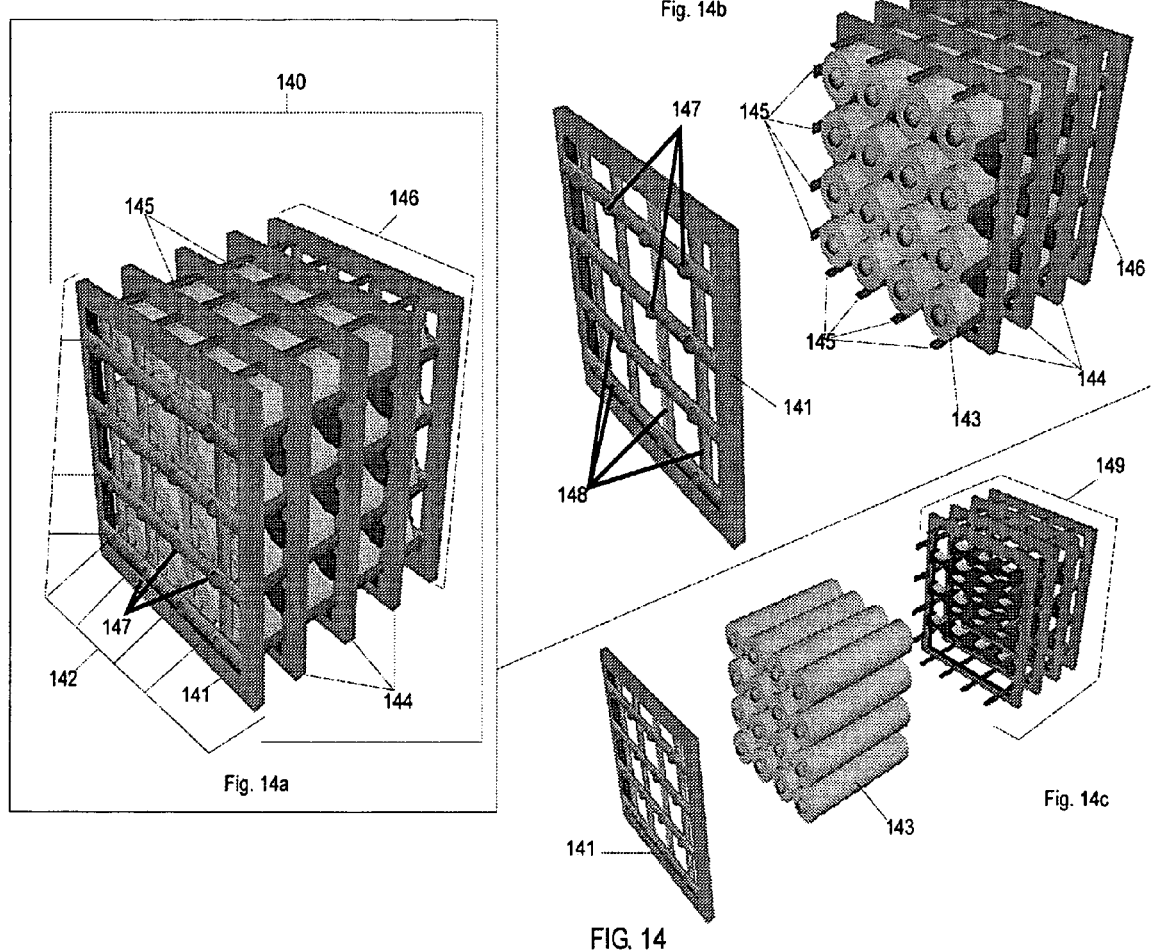
FIG. 14: Multiple Views of Intelligent Battery System

As shown in FIG. 14, the IBS 120 is a group of small rechargeable batteries 143 that are linked together in a Battery System Housing 149 that holds four matrix components that provide a series of multiple addressable power pathways between the Batteries 143 of the Battery System 140 and the overall IBS 120. The Battery System Housing 149 is held together by a number of brackets, the Battery Support Structure 144, that actually hold the component parts together. The four matrix components within the Battery System Housing 149 are the Positive Power Matrix 142 (in the Battery Door 141), the Negative Power Matrix 146 (at the rear end of the Battery support Structure 144), the Connector Matrix 145 (surrounding and held in place by the Battery support Structure 144) and the Transistorized Matrix Hubs (M-Hubs) 147.

Figure 15:
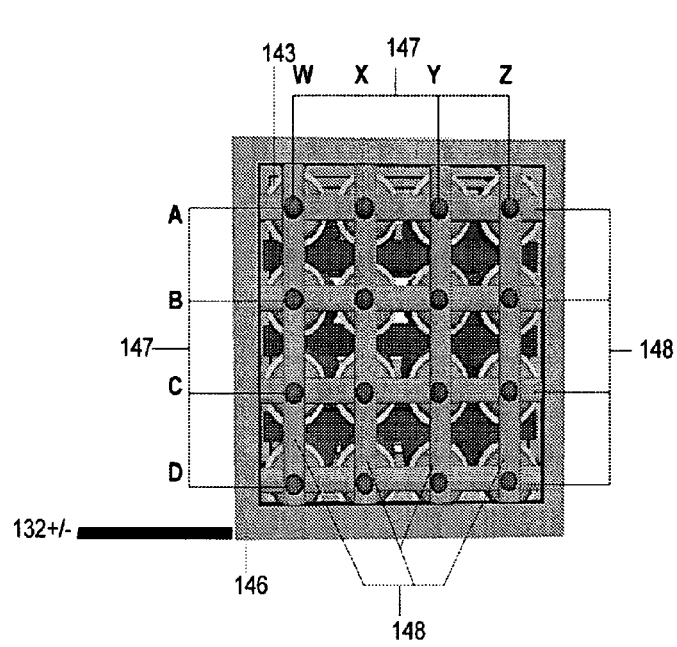
FIG. 15: Rear and Side views of Intelligent Battery System
Figure 15:
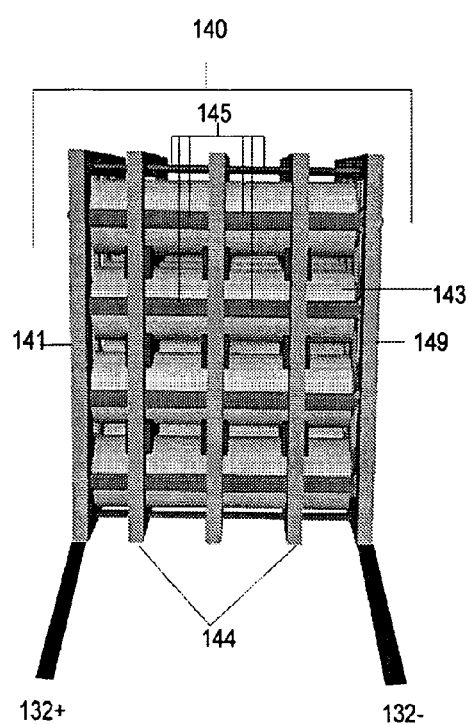

As shown in FIG. 14 and FIG. 15, three of the four matrix components (the Positive Power Matrix 142, the Negative Power Matrix 146, and the Connector Matrix 145) are formed from Multiple Filament Pathway Cables (MFPC) 148. The MFPC 148 are cables with multiple discrete electrical pathways that can carry electrical power simultaneously in one or both directions. The Positive Power Matrix 142 and the Negative Power Matrix 146 are formed in an X & Y pattern of MFPC at either end of the Battery System Housing 149. The Positive Power Matrix 142 has a terminus of the MFPC 148 coming out of it as the Positive Side Terminal Cable 132a. The Negative Power Matrix 146 has a terminus of the MFPC 148 coming out of it as the Negative Side Terminal Cable 132b.

As shown in FIG. 14b, the Positive Power Matrix 142 is a cross-hatch pattern of Multiple Filament Pathway Cables (MFPC) 148 held integral to the Battery Door 141, at the end of the Battery System 140 that has the positive ends of the Battery pack 143. Each intersection of MFPC 148 is at the contact point on a battery of the Battery pack 143. Each intersection of MFPC 148 is controlled by the presence of a Transistorized Matrix Hub 147 (M-Hub) 147.

As shown in FIG. 15a, the Negative Power Matrix 146 is a cross-hatch pattern of Multiple Filament Pathway Cables (MFPC) 148 held integral to the Battery Support Structure 144, at the end of the Battery System 140 that has the negative ends of the Battery pack 143. Each intersection of MFPC 148 is at the contact point on a battery of the Battery pack 143. Each intersection of MFPC 148 is controlled by the presence of a Transistorized Matrix Hub 147.

As shown in FIGS. 14a and 14b, the Connector Matrix 145 is a group of Multiple Filament Pathway Cables (MFPC) 148 that are positioned lengthwise down the side of the Battery Support Structure 144 in a pattern is held integral to the top, sides and bottom of the Battery Support Structure 144. The Connector Matrix 145 has sixteen different pathways that can connect the positive and negative ends of the Batteries 143 within the Battery System 140.

At each point where the different MFPC intersect there is a Transistorized Matrix Hub 147 at the intersection. Each battery of the batteries 143 in the Battery System 140 is matched up with a positive intersection in Matrix 142 and a corresponding negative intersection in Matrix 146, each intersection of the MFPC 148 having an M-Hub 147 at each end (positive and negative) of its length. The Connector Matrix 145 cables can link M-Hubs 147 at their level with M-Hubs 147 at the opposite end of each battery as desired by the IBS 120.

Each Transistorized Matrix Hub 147 has a number of small transistors and power transistors within its structure. The small transistors act as the gate keepers for control of the power transistors that actually switch power circuitry between the different conductive pathways of the Multiple Filament Pathway Cables 148 within the intersection at an M-Hub 147. Each M-Hub 147 will have an addressable code that will be under the control of the IBS 120. Sensor Circuitry 162 in the IBS 120 (located in the Power Management System 134) will look at and log the status of each battery in an ongoing sequence during the operational time of the Invention 10. This status review will determine the amount of energy in each battery at any time and will allow the IBS 120 to know when each battery needs to be recharged. As each battery in the Battery Pack 143 becomes depleted to the point where recharging is desirable, the Recharge Circuitry 163 will dispense power from the Power Management System 134 (being generated by the Generator System 90) to the appropriate Battery in Battery Pack 143. The individual batteries will be addressable via routing the recharge power via the Multiple Filament Pathway Cables 148. Destination addressing and routing of recharge power will be accomplished via the Transistorized Matrix Hub 147 at each battery location along the recharge power path. In this manner, one or multiple batteries of Battery Pack 143 can be addressed for recharging in the most advantageous manner.

Additionally, while recharging is taking place, discharging of one or multiple batteries of Battery Pack 143 can be taking place. The discharging can be to one output Power Outlet (as seen in FIG. 13) or thru multiple outlets simultaneously. One Power Outlet 154 may require four of the batteries of Battery Pack 143, while a second Power Outlet 154 requires two additional batteries of Battery Pack 143. The use of the Connector Matrix 145 in conjunction with the Positive Power Matrix 142 and Negative Power Matrix 146 allow the Transistorized Matrix Hubs 147 to be manipulated by the IBS 120 so that (for example) the four batteries (mentioned above) could be sequenced in series for a higher voltage output through one Power Outlet 154, while the two batteries (mentioned above) could be accessed in a parallel circuit so their output through a Power Outlet 154 would have a higher amp hour rating. In this scenario, six of the twelve batteries of Battery Pack 143 are being used to power devices via two Power Outlets 154 while six remain batteries in the Battery Pack 143 are either unused and kept off-line from discharging their power or one or more of them could be receiving a recharge current supplied by, and regulated by the Recharge Circuitry 163 within the Power Management System 134 using the Multiple Filament Pathway Cables 148 and the Transistorized Matrix Hub 147 to route and deliver the recharge current from the Generator System 90 to the Power Conditioning Circuitry 166 in Power Management System 134.

The overall matrix of connections is intended to provide a number of re-configurable electrical pathways that can release energy from the Batteries 143, as well as deliver recharge energy to the Batteries 143 from the Generator System 90.

Figure 17:
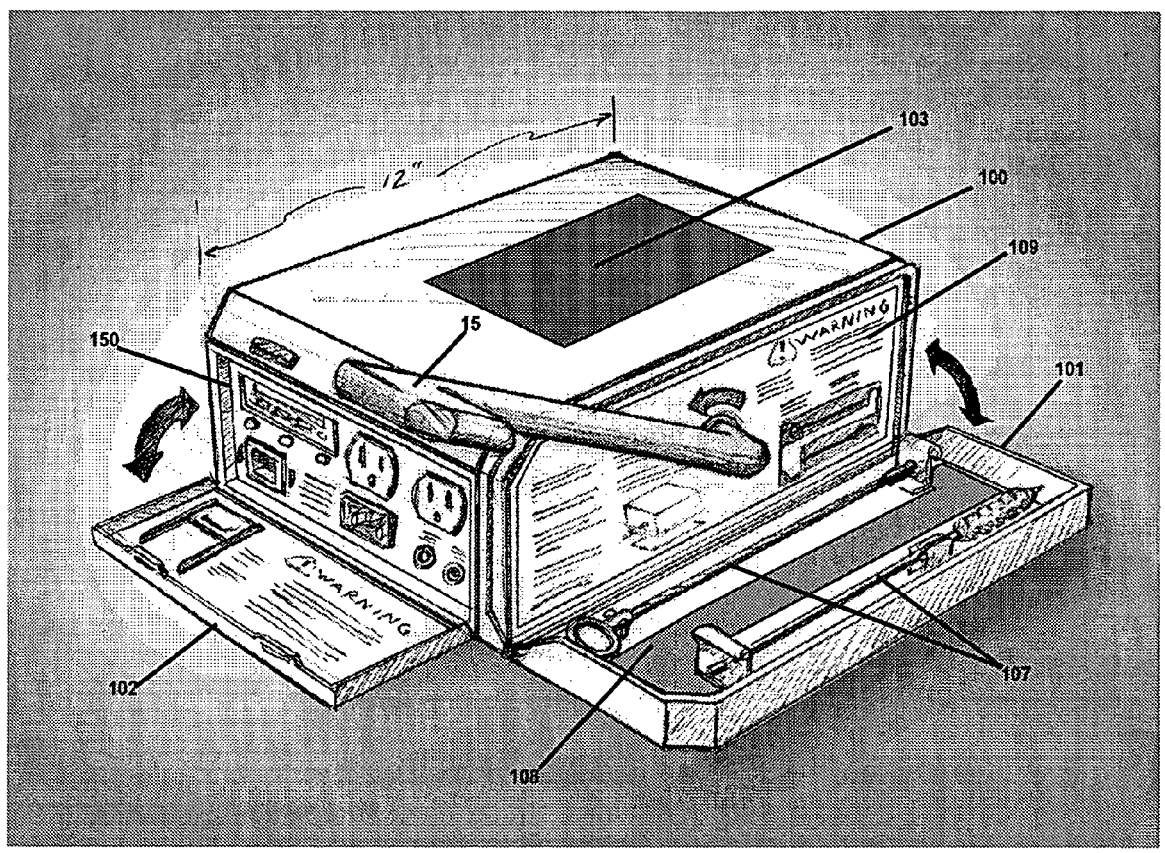
FIG. 17: Artist Rendering of exterior of Invention unit details
Figure 18:
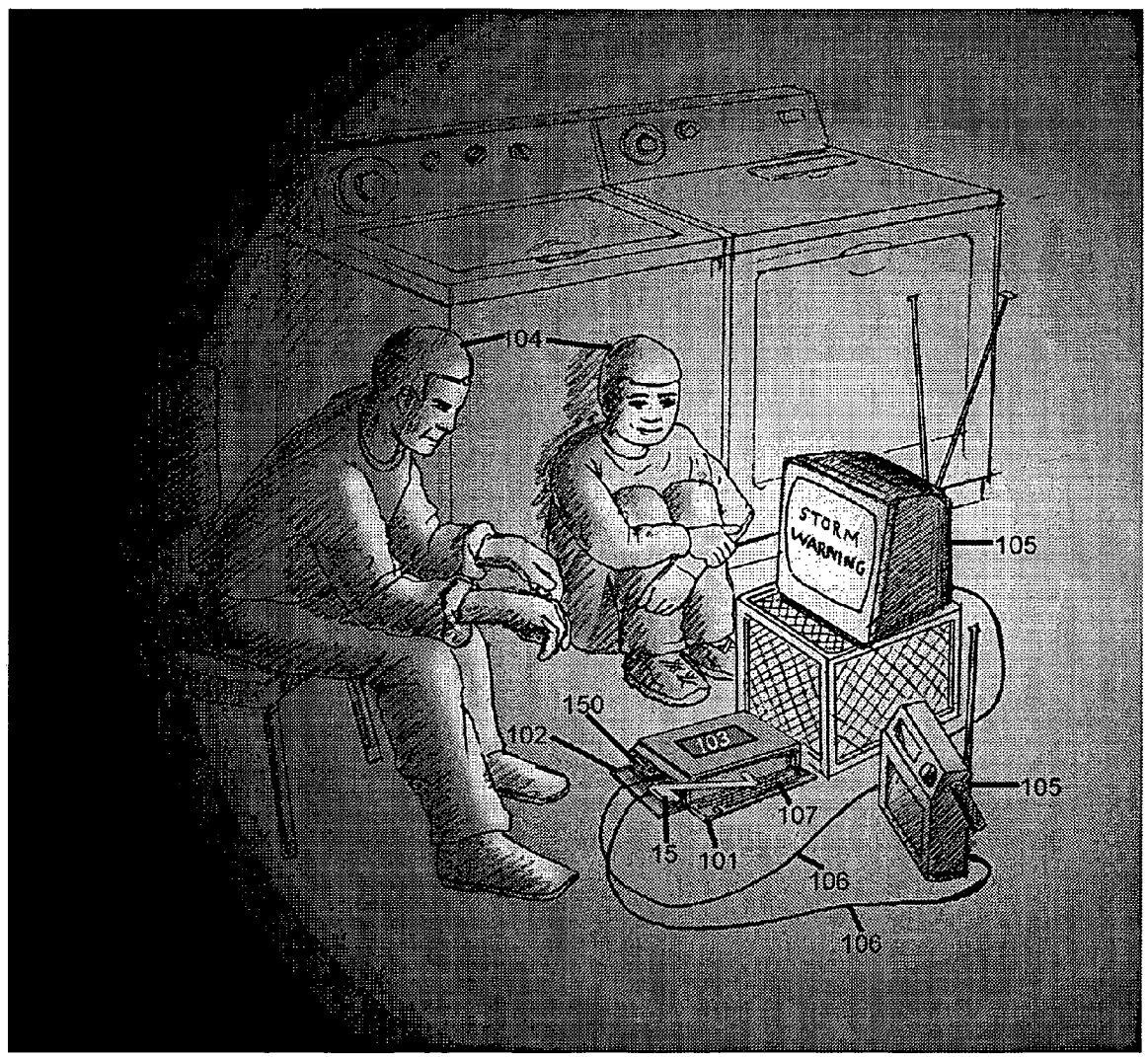
FIG. 18: Artist Rendering of Invention In-use during Weather Emergency
Figure 19:
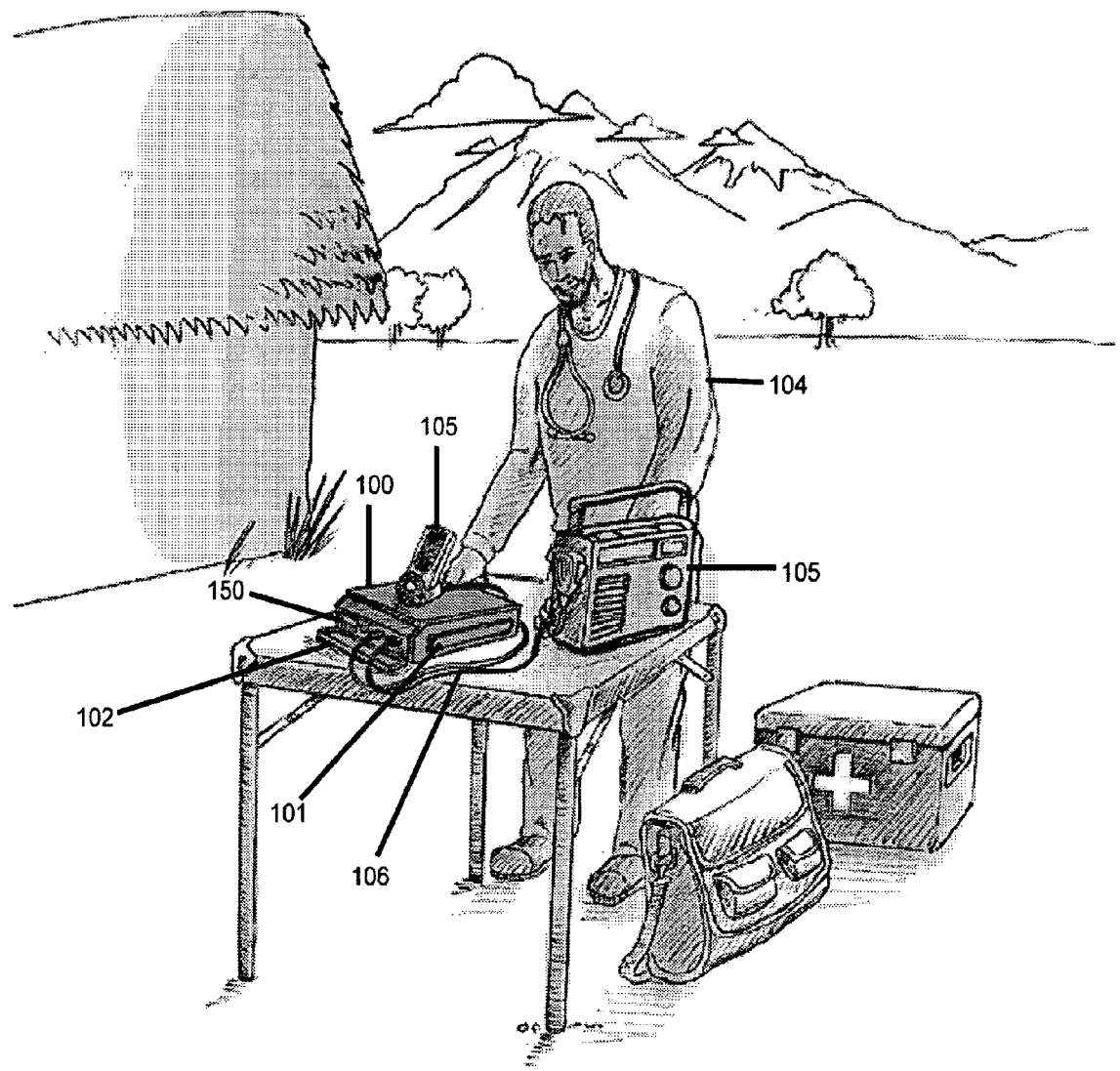
FIG. 19: Artist Rendering of Invention In-use in 3rd world Medical Situation
Figure 20:
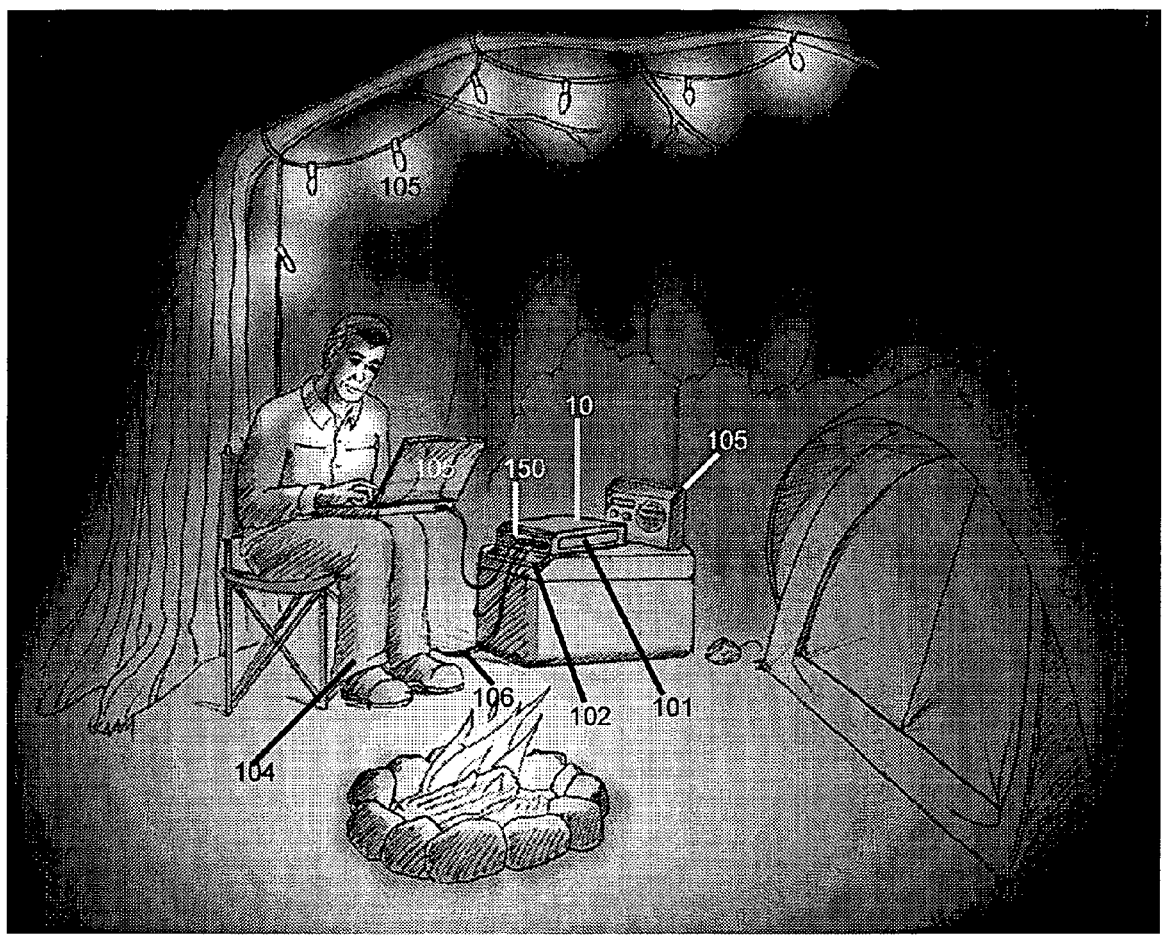
FIG. 20: Artist Rendering of Invention In-use in a Camping Situation

FIG. 17 shows a rendering of what a civilian version of the Invention 10 might look like. The Support Structure 100 is shown in a fully enclosed case view with two fold down doors 101 and 102 in their down position. Door 101 holds the Foot Lever 15 (shown inserted into the Input Gear Hub Hex 32 in the Support Structure 100 side opening hole 111) and cleaning/repair tools 107. The interior surface spaces of the outer shell of Support Structure 100 door 101 area have instructions 109 to operate the Invention 10. The Control Panel door 102 is shown in the folded down position showing the Control Panel 150. On the top of the Support Structure 100 is a reinforced standing area 103 that allows the user to stand on the Invention 10 while pressing the Foot Lever 15 with their foot as shown in FIG. 16c. FIGS. 18, 19 & 20 show the Invention in use during possible use scenarios like a household use in a natural disaster or violent weather (FIG. 17), 3rd world medical use (FIG. 19) and camping (FIG. 20).

By reviewing the above version the reader can see that the combination of features in the invention provides a highly advantageous system for the creation, storage, management and distribution of energy. The invention's physical operation is simple to use and easy to understand. While the above description contains much specificity, these should not be construed as limitations on the scope of the invention, but rather as an exemplification of one preferred version thereof. Many other variations are possible and can be envisioned by anyone skilled in the art without leaving the scope of the invention.

Kinetic Energy to Mechanical Energy system: The invention can use several types of natural or artificial kinetic energy to create a slow sustained, or rapid high energy, motion in a mechanical Energy transfer system. This includes the use of physical impacts, body kinetics to rotate a lever, high pressure gas moving a piston and other kinetic energy sources including, but not limited to the motion of pre-existing moving structures, waves, wind, explosive detonation, physical impacts from hammers or other weights falling, etc. One or more of these kinetic energy sources can be applied to a kinetic energy input transfer mechanism that introduces the kinetic energy into the invention. These input transfer mechanisms can include, but not limited to, gas pressure from a compressed gas source or explosive blank cartridge introduced directly or via a pressure accumulator to a turbine, a piston pushing a linkage or a piston pulling or pushing direct to a solid or flexible gear (i.e. a rack and pinion system) for transfer the kinetic Energy to Mechanical Energy. The energy input to the system can also be used to temporarily deform piezoelectric materials or dielectic elastomers to create an additional interim or final energy output within the system. The kinetic energy is converted to a high torque rotational energy that is geared (via a multiplier gear arrangement) to create multiple windings of a one or more constant force spring motors. Optimal efficiency would be to achieve a full winding of a multi-wind spring motor using a single input of any type of kinetic energy into the system. This input of kinetic energy would cause the Main Power Gear to rotate at a sufficient power to fully wind an entire spring motor to which it was attached. An example of how this would work: One hammer blow would move an input Piston (acting as the Rack in a Rack & Pinion gear system) to move across a Main Power Gear (the Pinion) in a linear motion that causes the Power Gear to rotate one full rotation. In turn, the Main Power Gear would rotate a parallel mounted 120 tooth Power Transfer Gear attached to its center hub. A smaller 8 tooth Multiplier Gear rides on the Power Transfer Gear. The Multiplier Gear is attached to the center of the hub of a 15-turn winding Spring Motor. A single turn of the Main Power Gear/Power Transfer Gear will cause 15 turns of the Multiplier Gear, thus creating a full winding of the Spring Motor with a single input of an appropriate amount of energy.

Momentary Energy to Stored Mechanical Energy system: The initial kinetic energy input to the system is used to wind, via the Main Power Gear linkage system, a spring motor or other spring system that is capable of being held in place under tension without degradation of the power being stored thus preserving the momentary initial kinetic energy as stored mechanical energy. A system is put in place to restrain the unwinding motion of the spring motor so that the energy in the spring can be maintained for an indefinite period of time and then released on demand. This can be a pawl system or other physical interlock that restrains the Spring Motors natural rotational motion to unwind. This restraining system allows for the restraining of one or a number of spring motors or other springs that can be released sequentially to create a steady flow of stored energy into the overall system. A system is put in place for addressing one or multiple spring motors that are sequentially available for charging by the momentary input of energy into the system. This spring motor addressing system can include, but is not limited to, a central winding hub that can be moved from one spring motor to the next via a simple screw rotation or direct pressure system which moves the locking mechanism into place within a power transfer shaft that runs through the hub of each spring motor.

Further, a means and method of activating the addressing mechanism for attaching to, and dis-attaching from, each spring motor in sequence so that a single drive shaft can be used to address multiple spring motors within the same system.

Further, a means and method to coordinate the charging of one or more spring motors from the momentary energy system while other spring motors within the same system are allowed to release their rotational energy to do work, i.e. the production of electrical power via the spinning of a generator.

A Stored Mechanical Slow Rotation High Torque Energy to High Speed Low Torque Rotation: An Output Gear is attached to the hub of each Storage Reel on each Spring Motor. In a single spring motor system the Output Gear is directly connected to the gears of the output delivery system. In multiple spring motor systems the Output Gear system is addressed sequentially by a Release System that allows each spring motor Output Gear to release its energy into the system. This Release system is activated by disengaging the Pawl or other retention system for the selected Output Gear. The Power Gear rides on a spline shaft that travels perpendicular to the gear plane of the Spring Motor Output Gear. The Power Gear turns with the rotation of the spring motor Output Gear and in turn rotates the Spline gear rod which has one end attached to the center hub of the output power delivery system. The output power delivery system is a multiplier Gear system that operates with the invention regardless of the use of one or more Spring Motors in the invention. For example: 120 teeth on the Delivery Gear that we will call Large Driver Gear #1 intersects with the 8 teeth of Smaller Drive Gear #2 equaling a 15 to 1 speed increase ratio per turn of gear #1. Smaller Drive Gear #2 is attached to the hub of a Large Driver Gear #3 which has 120 teeth. Large Driver Gear #3 intersects with the 8 teeth of Smaller Drive Gear #4 equaling a 15 to 1 speed increase ration per turn of gear #3. In this way, through a series of these type of speed multiplying gear systems, a slow high torque rotational drive force that is stored in each spring motor can be transformed into a high speed but lower torque rotational energy.

High Speed Low Torque Rotation Spins a Generator to become Electrical Energy: The high speed low torque rotational energy of the output power gear system is connected to an electrical generator system, or Generator, that is structured to accept the speed and torque of the rotational output and convert it, via the Generator's structure, into electrical power. The high speed spin and lower torque energy of the final gear power output of the Multiplier Gear system may or may not be sufficient to break the stand-still inertia of a generator (especially a generator with sufficient mass to create the energy outputs that may be desired). If the energy to break inertia is present in the output from the Multiplier Gear system then the invention through-put directly creates electrical energy. If the energy to break inertia is not present in the output from the Multiplier Gear system then the invention through-put needs a helping hand to break the inertia of the at-rest generator. If this is the case, then there is a need within this system for a supplementary power source sufficient to bring the rotation of the Generator up to the rotational speed needed by the invention to be able to start to generate power. The generator's rotational speed would need to be close to matching the speed of the available Multiplier Gearing output so the gear output could sustain the momentum and allow it to generate power. A means and method is available to bring the Generator up to speed. Using an external hand-powered pull device, akin to a pull starter on a gas powered lawn mower, the user of the invention can input a small amount of their personal physical energy or body kinetics (via jerk on a cord or handle) to break the inertia of the Generator and cause the high speed spin of the Generator to be compatible with the high speed low torque spin of the gear output. In this way the system does not need to expend any energy on breaking the standstill inertia of the of getting the Generator up to speed and thus can use direct multiplied conversion of the spring motor energy into a lower torque but higher speed rotational energy to maintain the spin of the Generator.

Various designs can be used in the construction of the Generator and its initial inertia breaking mechanism. Stored energy from an initial high energy momentary power source can be stored to cause the spin of the Generator and the invention's basic rotational power can be used to generate electrical power once the inertia has been broken.

The invention is not intended to be limited to the preferred versions described above, but rather is intended to be limited only by the claims set out below. Thus, the invention encompasses all different versions that fall literally or equivalently within the scope of these claims.

What is claimed is:

1. A power system comprising:
   a. an electrical generator;
   b. a spring motor driving the generator;
   c. a power outlet;
   d. power management means for connecting multiple batteries to both the power outlet and the electrical generator, wherein:
      (1) one or more of the batteries have switchable connections allowing their selective connection to one of the electrical generator and the power outlet; and
      (2) some of the batteries are chargeable by the electrical generator while others are discharging electricity through the power outlet.

2. The power system of claim 1 wherein at least some of the batteries also have switchable connections allowing them to be selectively connected to other ones of the batteries in series or parallel.

3. The power system of claim 2 wherein at least some of the batteries also have switchable connections allowing them to be selectively disconnected from electrical communication with all of the other batteries, the electrical generator, and the power outlet simultaneously.

4. The power system of claim 1 wherein the spring motor only drives the generator when the electricity in the batteries drops below a threshold level.

5. The power system of claim 1:
   a. wherein the spring motor includes:
      (1) a spring having opposing ends, the spring being biased to unwind from one end while winding at the opposing end;
      (2) a spring motor input shaft which:
         (a) winds one end of the spring when rotated in an input direction, and
         (b) freely rotates when rotated in the opposite direction; and
      (3) a spring motor output shaft which:
         (a) drives the generator when one of the ends of the spring unwinds in an output direction, and
         (b) freely rotates when this same end of the spring winds in the opposite direction.

6. The power system of claim 5 further comprising one or more gears coupling the electrical generator to the spring motor output shaft, wherein the gears adapt the rotary output of the spring motor output shaft into a higher-speed rotary input to the electrical generator.

7. The power system of claim 5 further comprising a power input means for providing a rotary input to the spring motor input shaft.

8. The power system of claim 1 wherein the power input means includes at least one of the following:
   a. a pivotable lever; or
   b. a reciprocable shaft.

9. A power system comprising:
   a. a spring motor, the spring motor including:
      (1) a spring having opposing ends, the spring being biased to unwind from one end while winding at the opposing end;
      (2) a spring motor input shaft which:
         (a) winds one end of the spring when rotated in an input direction, and
         (b) freely rotates when rotated in the opposite direction; and
      (3) a spring motor output shaft which:
         (a) roes in an output direction when one of the ends of the spring unwinds, and
         (b) freely rotates when this same end of the spring winds;
   b. power input means for providing a rotary input to the spring motor input shaft in the input direction when an energy input is provided to the power input means;
   c. an electrical generator coupled to the spring motor output shaft, the generator producing electricity when the spring motor output shaft rotates in the output direction;
   d. a battery storing the electricity from the generator; and
   e. a power management means for managing the power flow between the electrical generator and the battery.

10. The power system of claim 9 wherein multiple batteries store the energy from the generator, the multiple batteries being connectable to both the power outlet and the electrical generator, wherein:
    a. one or more of the batteries have switchable connections allowing their selective connection to the electrical generator or to the power outlet;
    b. some of the batteries are chargeable by the electrical generator while others are discharging electricity through the power outlet.

11. The power system of claim 10 wherein at least some of the batteries also have switchable connections allowing them to be selectively switched between series and parallel connections with other ones of the batteries.

12. The power system of claim 10 wherein at least some of the batteries also have switchable connections allowing them to be selectively disconnected from electrical communication with all of the other batteries, the electrical generator, and the power outlet simultaneously.

13. The power system of claim 9 further comprising one or more pawls engageable with the spring motor output shaft, wherein the engaged pawls restrain the spring motor output shaft from rotating in the output direction.

14. The power system of claim 13 wherein the pawls are actuated to disengage the spring motor output shaft when the electricity in the batteries drops below a threshold level.

15. The power system of claim 9 further comprising one or more gears coupling the electrical generator to the spring motor output shaft, wherein the gears provide a rotary input to the electrical generator at a higher speed than the rotary output of the spring motor output shaft.

16. The power system of claim 9 wherein the power input means includes at least one of the following:
   a. a pivotable lever; or
   b. a reciprocable shaft.

17. A power system comprising:
   a. a spring motor, the spring motor including:
      (1) a spring having opposing ends, the spring being biased to unwind from one end and wind at the opposing end;
      (2) a spring motor input shaft which:
         (a) winds one end of the spring when rotated in an input direction, and
         (b) freely rotates when rotated in the opposite direction; and
      (3) a spring motor output shaft which:
         (a) rotates in an output direction when one of the ends of the spring unwinds, and
         (b) freely rotates when this same end of the spring winds;
   b. power input means for providing a rotary input to the spring motor input shaft;
   c. an electrical generator coupled to the spring motor output shaft, the generator producing electricity when the spring motor output shaft rotates in the output direction;
   d. a power outlet; and
   e. power management means for connecting multiple batteries to both the power outlet and the electrical generator, wherein:
      (1) one or more of the batteries have switched connections allowing their selective connection to the electrical generator or to the power outlet;
      (2) some of the batteries are chargeable by the electrical generator while others are discharging electricity through the power outlet.

18. The power system of claim 17 wherein at least some of the batteries also have switched connections allowing them to be selectively:
   a. switched between series and parallel connections with other ones of the batteries, and
   b. disconnected from electrical communication with the electrical generator and the power outlet simultaneously.

19. The power system of claim 18 further comprising one or more pawls engageable with the spring motor output shaft, wherein:
   a. the engaged pawls restrain the spring motor output shaft from rotating in the output direction, and
   b. the pawls are actuated to disengage the spring motor output shaft when the electricity in the batteries drops below a predetermined level.

* * * * *